US010730471B2

(12) United States Patent
Nakano

(10) Patent No.: US 10,730,471 B2
(45) Date of Patent: Aug. 4, 2020

(54) AIRBAG DEVICE

(71) Applicant: TOYODA GOSEI CO., LTD., Kiyosu-shi, Aichi-ken (JP)

(72) Inventor: Nobuya Nakano, Osaka (JP)

(73) Assignee: TOYOTDA GOSEI CO., LTD., Aichi-pref. (JP)

( * ) Notice: Subject to any disclaimer, the term of this patent is extended or adjusted under 35 U.S.C. 154(b) by 95 days.

(21) Appl. No.: 16/124,426

(22) Filed: Sep. 7, 2018

(65) Prior Publication Data
US 2019/0100165 A1   Apr. 4, 2019

(30) Foreign Application Priority Data

Sep. 29, 2017 (JP) .................. 2017-190226
Mar. 30, 2018 (JP) .................. 2018-066805

(51) Int. Cl.
*B60R 21/217*  (2011.01)
*B60R 21/264*  (2006.01)
*B60R 21/231*  (2011.01)
*B60R 21/207*  (2006.01)
*B60R 21/237*  (2006.01)
*B60R 21/00*   (2006.01)

(52) U.S. Cl.
CPC .......... *B60R 21/217* (2013.01); *B60R 21/207* (2013.01); *B60R 21/2171* (2013.01); *B60R 21/237* (2013.01); *B60R 21/23138* (2013.01); *B60R 21/264* (2013.01); *B60R 2021/0006* (2013.01); *B60R 2021/0032* (2013.01); *B60R 2021/23146* (2013.01)

(58) Field of Classification Search
CPC . B60R 21/217; B60R 21/2171; B60R 21/207; B60R 21/23138; B60R 2021/0032; B60R 2021/0006; B60R 2021/23146
See application file for complete search history.

(56) References Cited

U.S. PATENT DOCUMENTS

| 2010/0096841 A1* | 4/2010 | Tanaka ................ B60R 21/2032 |
| | | 280/730.1 |
| 2017/0361803 A1* | 12/2017 | Nagata .................. B60R 21/217 |
| 2018/0086296 A1* | 3/2018 | Kino ................. B60R 21/23138 |
| 2018/0194318 A1* | 7/2018 | Hioda ................... B60R 21/215 |
| 2018/0345900 A1* | 12/2018 | Hiraiwa ............... B60R 21/239 |
| 2019/0118757 A1* | 4/2019 | Okayama ........... B60R 21/2171 |

(Continued)

FOREIGN PATENT DOCUMENTS

JP      2017-081248 A     5/2017

*Primary Examiner* — Karen Beck
(74) *Attorney, Agent, or Firm* — Posz Law Group, PLC

(57) ABSTRACT

An airbag device includes: a gas generator which is extended along an axial line thereof and which includes: a generator body including a gas injection section at one end section; and an installing protrusion protruding from an outer face of the generator body; and an airbag which includes a bag body developed and inflated by an inflation gas supplied from the gas injection section. The gas generator and the airbag are installed on a vehicle by the installing protrusion. The bag body includes an insertion port having a size allowing the gas injection section to pass through and not allowing a portion of the gas generator provided with the installing protrusion to pass through. The gas injection section is disposed inside the bag body, and the installing protrusion is disposed outside the bag body.

20 Claims, 20 Drawing Sheets

(56) References Cited

U.S. PATENT DOCUMENTS

| | | | | |
|---|---|---|---|---|
| 2019/0152421 | A1* | 5/2019 | Byun | B60R 21/2334 |
| 2019/0161050 | A1* | 5/2019 | Schneider | B60R 21/2338 |
| 2019/0299917 | A1* | 10/2019 | Nagasawa | B60R 21/207 |
| 2020/0001819 | A1* | 1/2020 | Moon | B60R 21/2338 |
| 2020/0017055 | A1* | 1/2020 | Deng | B60R 21/2338 |

* cited by examiner

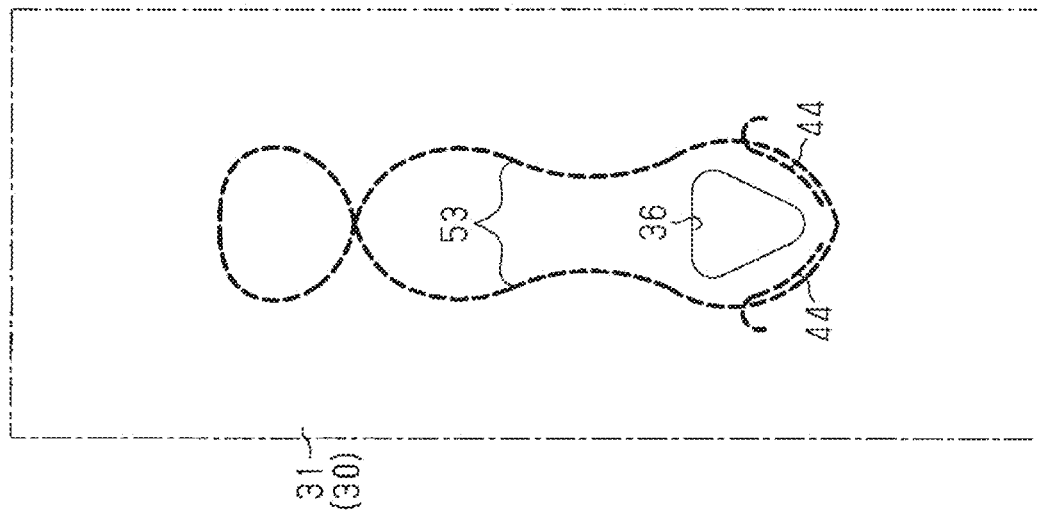
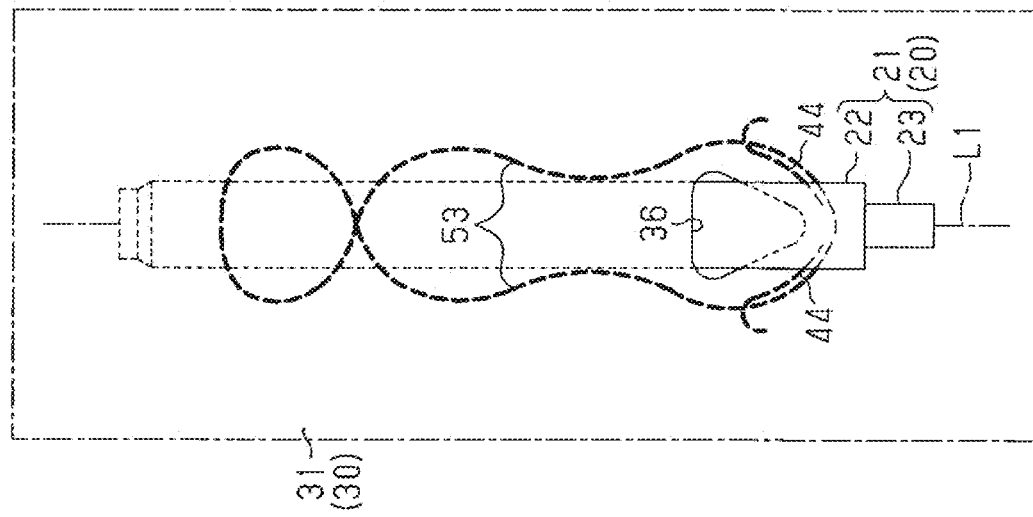

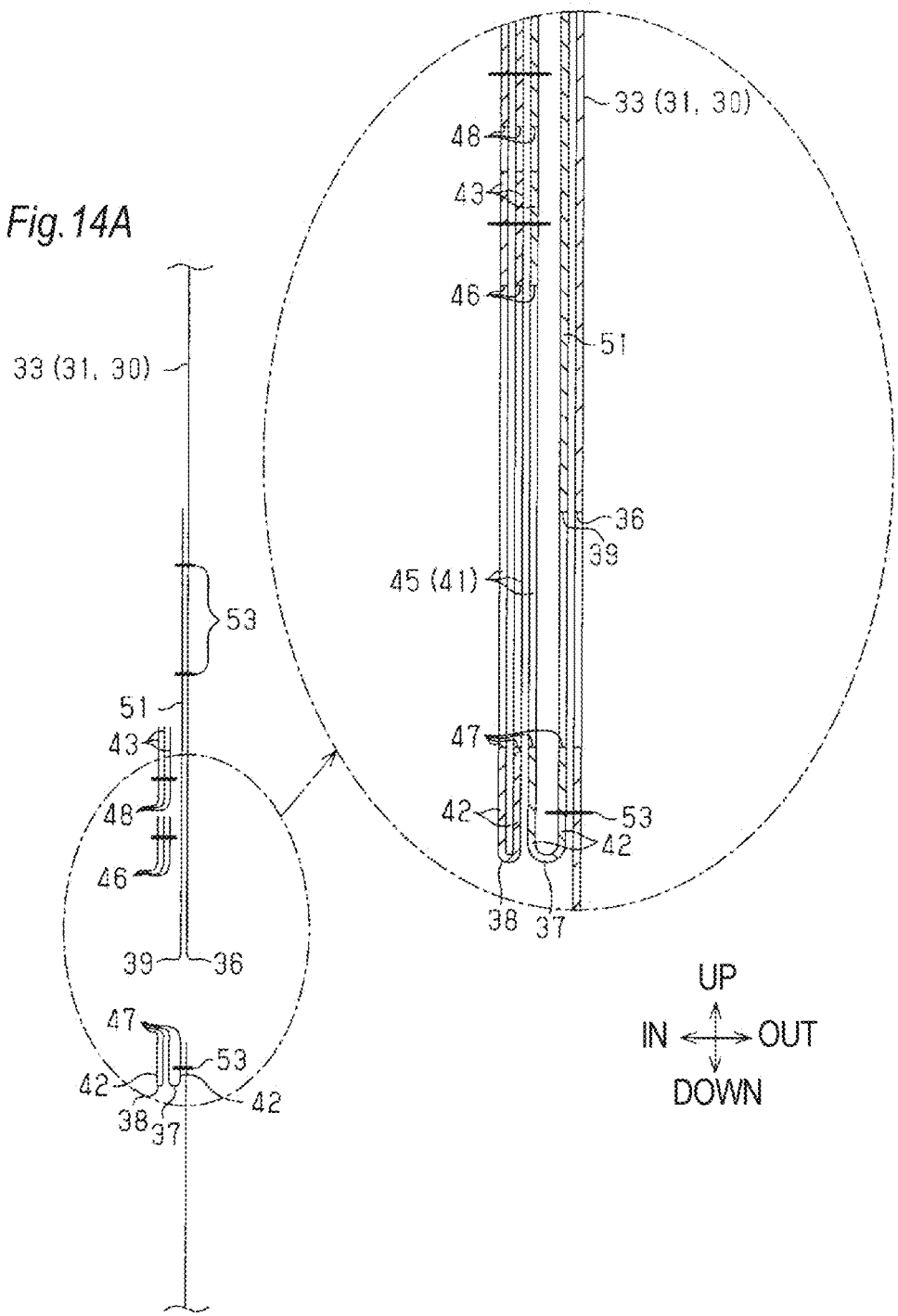

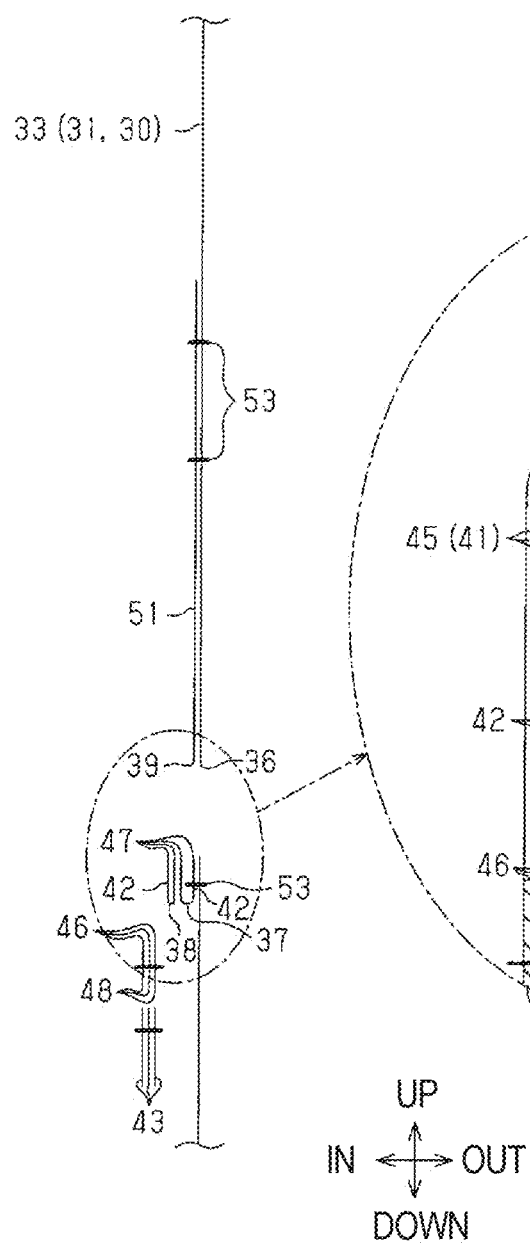
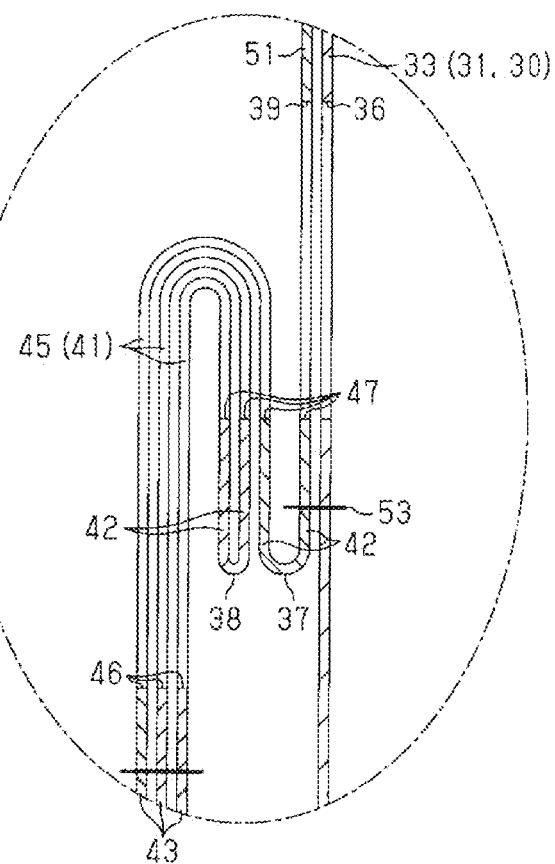
Fig.15A
Fig.15B

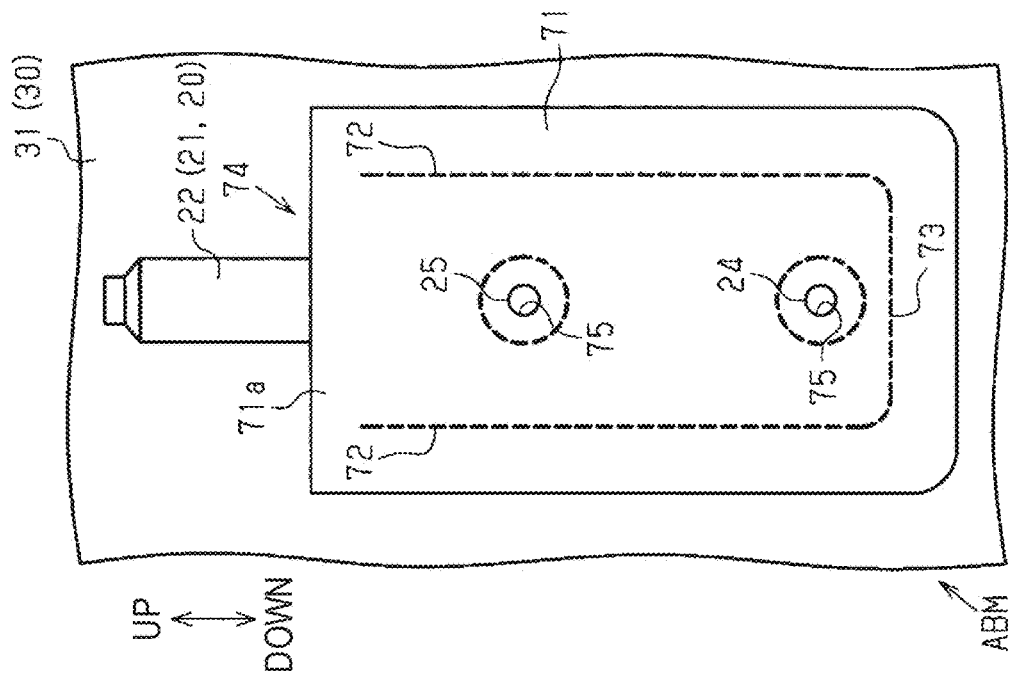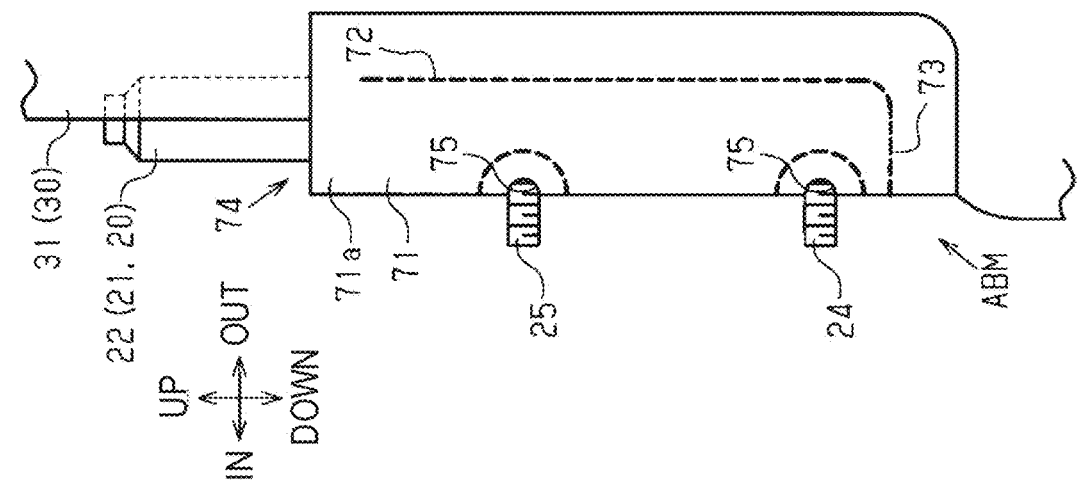

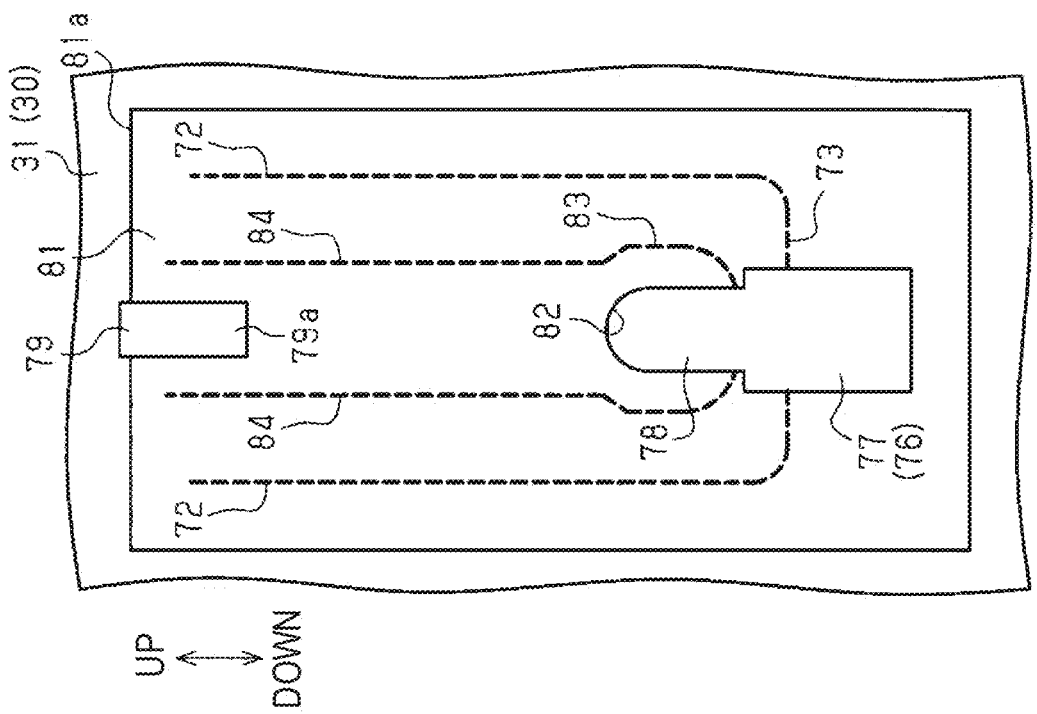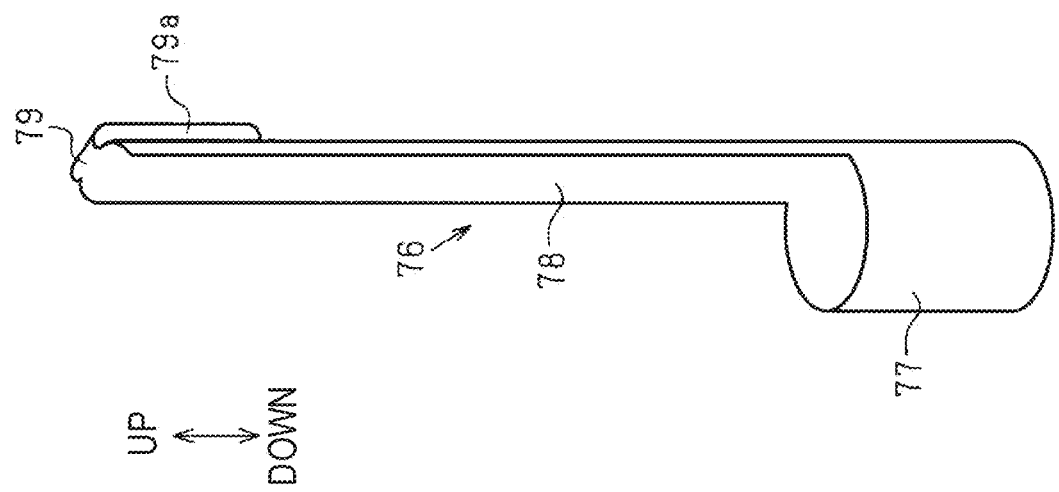

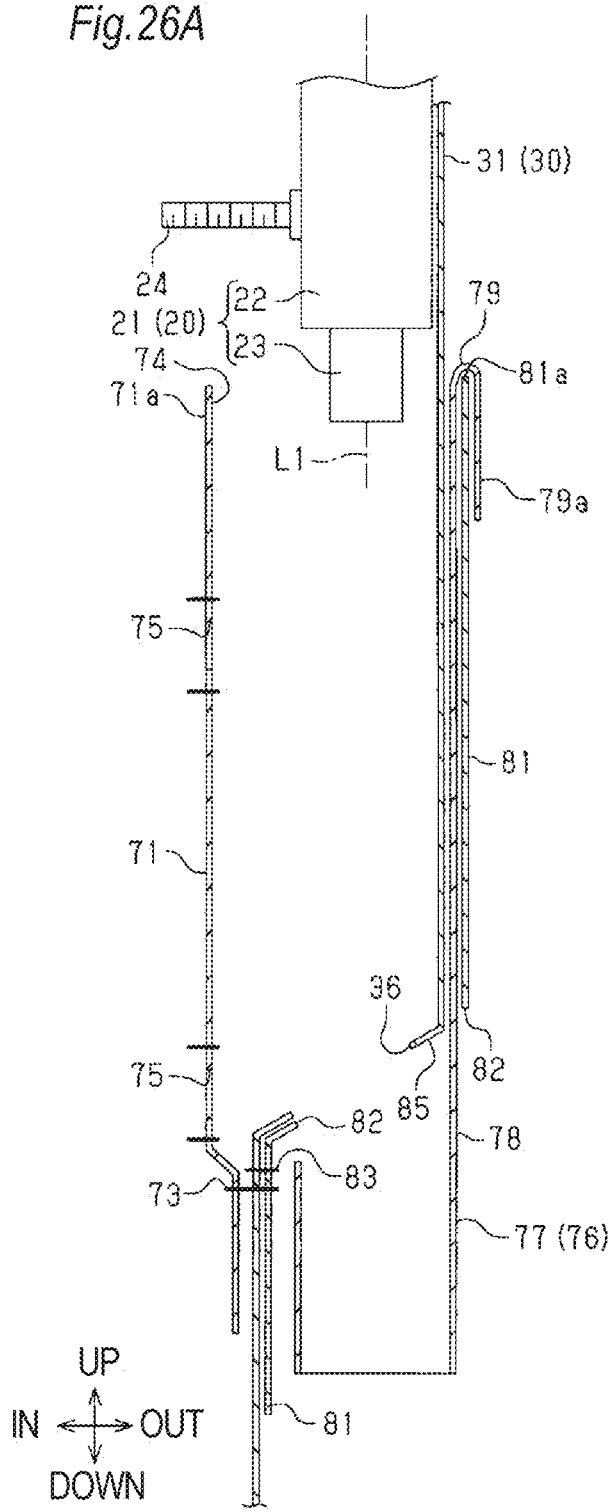
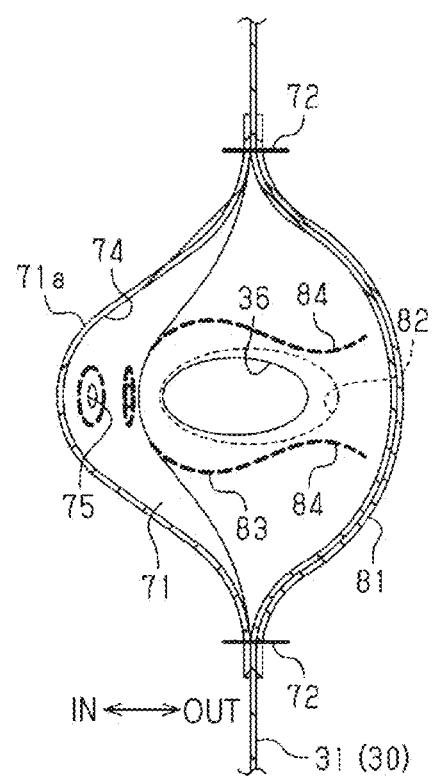
Fig.26A
Fig.26B

AIRBAG DEVICE

CROSS-REFERENCE TO RELATED APPLICATION(S)

This application is based upon and claims the benefit of priority from prior Japanese patent applications No. 2017-190226, filed on Sep. 29, 2017 and No. 2018-066805, filed on Mar. 30, 2018, the entire contents of which are incorporated herein by reference.

BACKGROUND

1. Technical Field

The present invention relates to an airbag device that develops and inflates an airbag at a portion close to an occupant sitting on a vehicle seat in the case that an impact is applied to a vehicle due to a collision or the like, thereby protecting the occupant from the impact.

2. Background Art

In the case that an impact is applied to a vehicle due to a collision or the like, an airbag device equipped with a gas generator and an airbag is effective as a device for protecting an occupant from the impact.

For example, the airbag device described in JP-A-2017-81248 uses a gas generator that is extended along the axial line thereof, at one end section of which a gas injection section is provided and at the other end section of which a harness is connected, and is equipped with a pair of bolts protruding from the outer face of the generator body thereof around the axial line. Furthermore, the airbag device uses an airbag that is developed and inflated by inflation gas injected from the gas injection section and is equipped with a bag body having a slit for allowing the gas generator to be inserted and a cover cloth for covering the slit.

When the gas generator is assembled on the airbag in the above-mentioned airbag device, the major portion of the gas generator including both the bolts is inserted into the bag body through the slit with the gas injection section as the head. The pair of bolts protruding from the generator body inside the bag body is inserted into the bag body. Both the bolts are installed on a vehicle body together with the bag body at the portions that are exposed to the outside of the bag body by the insertion.

The harness and the end section of the generator body on the side of the harness are disposed outside the bag body. The harness, the exposed portion of the generator body and the slit are covered with the cover cloth. The cover cloth is engaged with the bolts by inserting the bolts into the engaging holes formed in the cover cloth.

However, the gas generator is equipped with the bolts protruding from the outer face of the generator body as described above. The length of the slit is set to a length so that the gas generator passes through the slit not only at the gas injection section but also at the portions provided with the bolts. Hence, the length of the slit becomes longer by the amount required for the bolts, and a clearance that may form a leakage path of the inflation gas occur between the generator body and the slit. Moreover, the cover cloth for covering the slit is just engaged with the bolts located away from the slit. Consequently, after the inflation gas inside the bag body has leaked through the clearance between the generator body and the slit, the inflation gas further leaks through the clearance between the cover cloth and the bag body.

The present invention has been made in consideration of these circumstances, and an object thereof is to provide an airbag device capable of suppressing inflation gas from leaking to the outside of the airbag thereof.

SUMMARY

According to an aspect of the invention, there is provided an airbag device comprising: a gas generator which is extended along an axial line thereof and which includes: a generator body including a gas injection section at one end section; and an installing protrusion protruding from an outer face of the generator body surrounding the axial line; and an airbag which includes a bag body developed and inflated by an inflation gas supplied from the gas injection section, wherein the gas generator and the airbag are installed on a vehicle by the installing protrusion, the bag body includes an insertion port having a size allowing the gas injection section to pass through and not allowing a portion of the gas generator provided with the installing protrusion to pass through, and the gas injection section passes through the insertion port and is disposed inside the bag body, and the installing protrusion is disposed outside the bag body.

BRIEF DESCRIPTION OF THE DRAWINGS

FIG. 12 is a partial side view showing an insertion port and the peripheral portion thereof in the first embodiment, as viewed from the inside (the rear side in FIG. 9) of the bag body of the airbag;

FIG. 13 is a partial side view showing the relationship between the insertion port of the bag body and the gas generator, the gas injection section thereof being inserted in the insertion port, in the first embodiment, as viewed from the inside (the rear side in FIG. 9) of the bag body;

FIG. 14A is a partially sectional view taken on line 14a-14a of FIG. 8, and FIG. 14B is an enlarged partially sectional view showing a part of FIG. 14A;

FIG. 15A is a partially sectional view showing a state when the belt of the airbag shown in FIG. 14A is folded at the time of assembling the gas generator on the airbag, and FIG. 15B is an enlarged partially sectional view showing a part of FIG. 15A:

FIG. 18 is a partial side view showing a second embodiment being embodied as a side airbag device for a vehicle, also showing a state when a gas generator has been assembled on an airbag;

FIG. 19 is a partial rear view showing a state when the gas generator is assembled on the airbag in the second embodiment:

FIG. 21 is a partial side view showing an inside cloth and an insertion assisting tool according to the second embodiment, as viewed from the inside (the rear side in FIG. 18) of the bag body in the second embodiment:

FIG. 22 is a perspective view showing the insertion assisting tool according to the second embodiment;

FIG. 26A is a partially sectional view corresponding to FIG. 16 and showing a state before the gas injection section is inserted into the insertion port of the bag body, and FIG. 26B is a partially sectional top view showing a state when the peripheral portion of the insertion port in the bag body is deformed so as to be away from the cover cloth to the inner side of the bag body.

DETAILED DESCRIPTION OF EXEMPLARY EMBODIMENTS

First Embodiment

A first embodiment being embodied as a side airbag device for a vehicle will be described below referring to FIGS. 1 to 7.

In the following descriptions, the advancing direction of a vehicle is described as forward and the reversing direction of the vehicle is described as rearward. Furthermore, the central section of the vehicle in the width dimension (vehicle width direction) is used as a reference; the side approaching the center section is referred to as the vehicle interior side, and the side going away from the center section is referred to as the vehicle exterior side. Moreover, it is assumed that an occupant having a physique similar to that of a collision test dummy is sitting on a vehicle seat in a predetermined normal posture.

Figure 1:
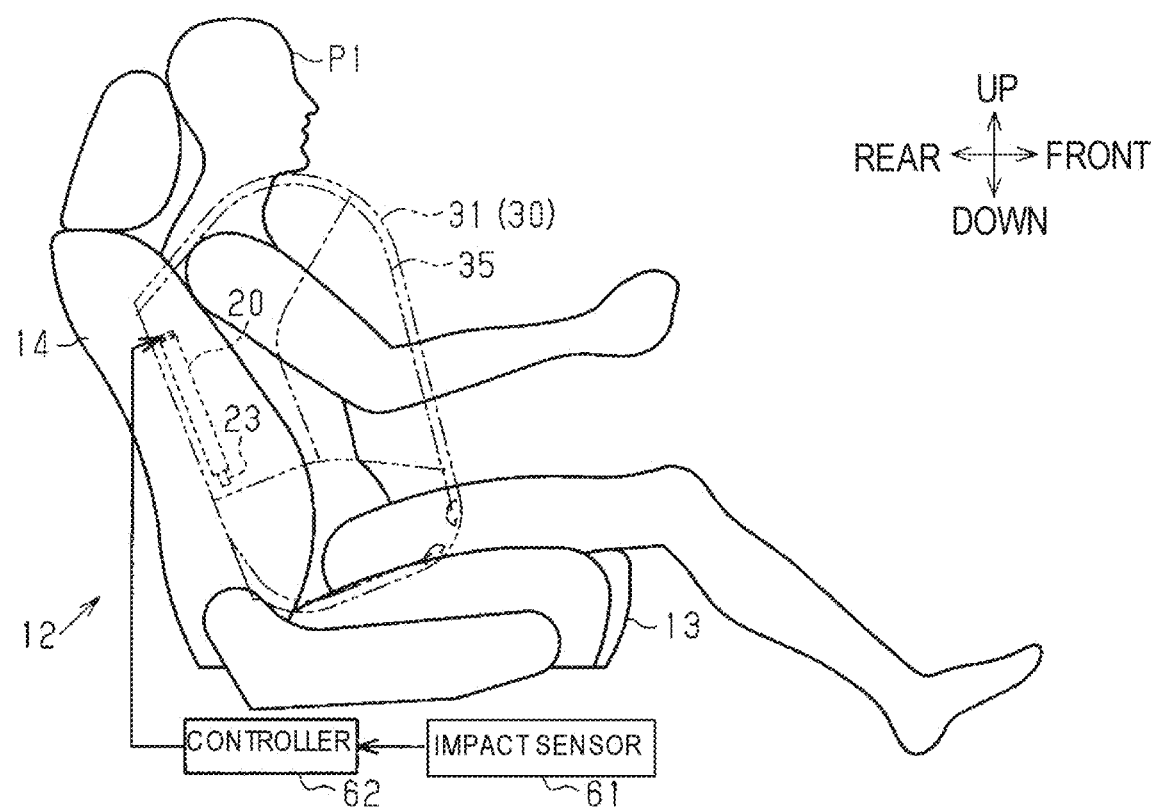
FIG. 1 is a side view showing a first embodiment being embodied as a side airbag device for a vehicle, also showing a vehicle seat provided with the device and an occupant.
Figure 2:
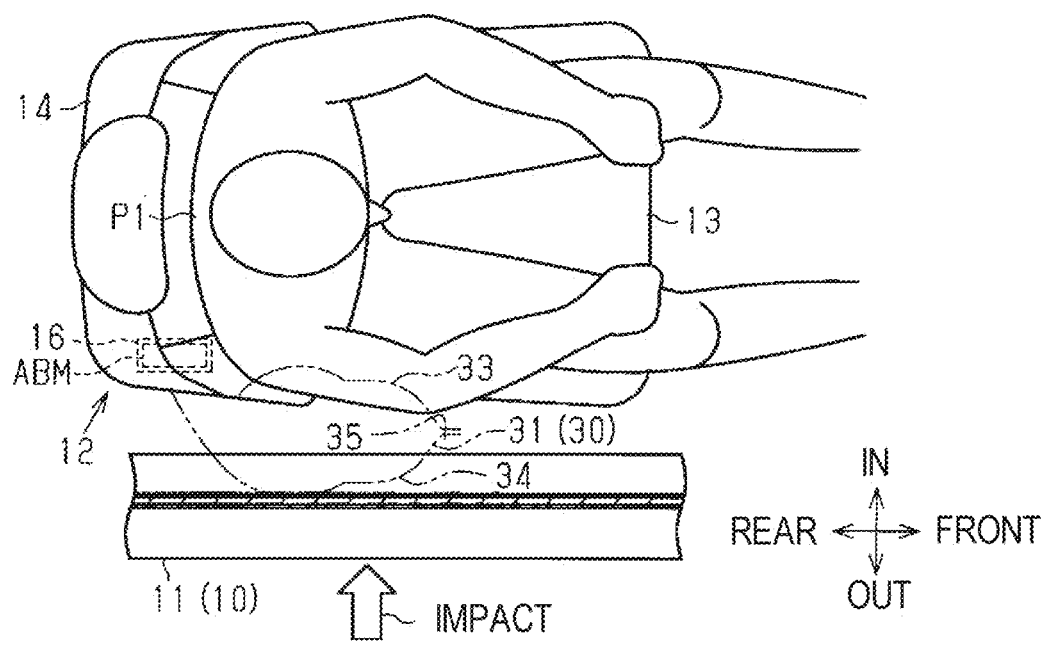
FIG. 2 is a partial top view showing the positional relationship among the vehicle seat, the airbag, the occupant and the side wall section of the vehicle in the first embodiment.
Figure 3:
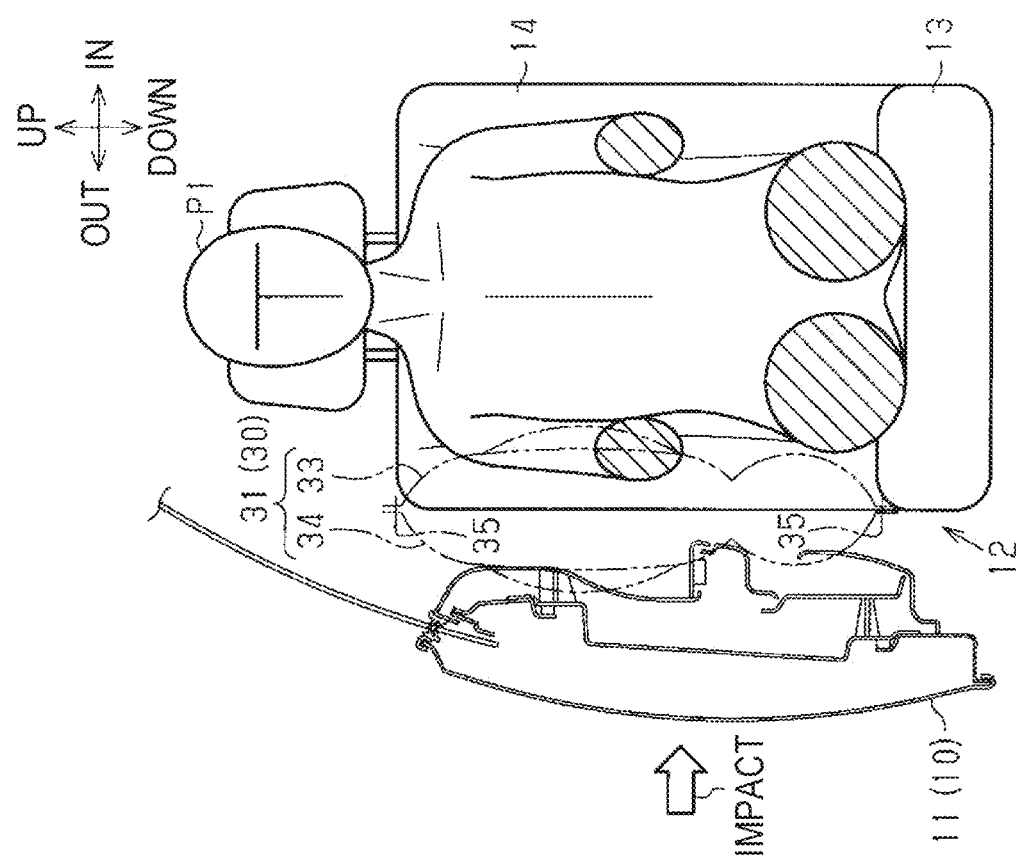
FIG. 3 is a partially sectional view showing the positional relationship among the vehicle seat, the airbag, the occupant and the side wall section in the first embodiment, as viewed from the front of the vehicle.

As shown in FIGS. 1 to 3, a vehicle seat 12 serving as a car seat constituting a front seat is disposed in the vicinity of the vehicle interior side of the side wall section 11 in a vehicle 10 serving as a car. The side wall section 11 herein designates vehicle components disposed on the side section of the vehicle 10 and mainly corresponds to doors, pillars and the like. The side wall section 11 corresponding to the front seat includes a front door, a center pillar (B-pillar), etc.

The vehicle seat 12 is equipped with a seat cushion 13 and a seat back 14. The seat cushion 13 is installed so as to be adjustable in position forward and rearward with respect to the floor of the vehicle. The seat back 14 stands upright in a state of being inclined from the rear section of the seat cushion 13 backwardly toward the upper side, and its inclination angle is made adjustable. The vehicle seat 12 is disposed inside the vehicle compartment while having a posture such that the seat back 14 faces forward. The width direction of the vehicle seat 12 disposed as described above is coincident with the vehicle width direction.

Figure 5:
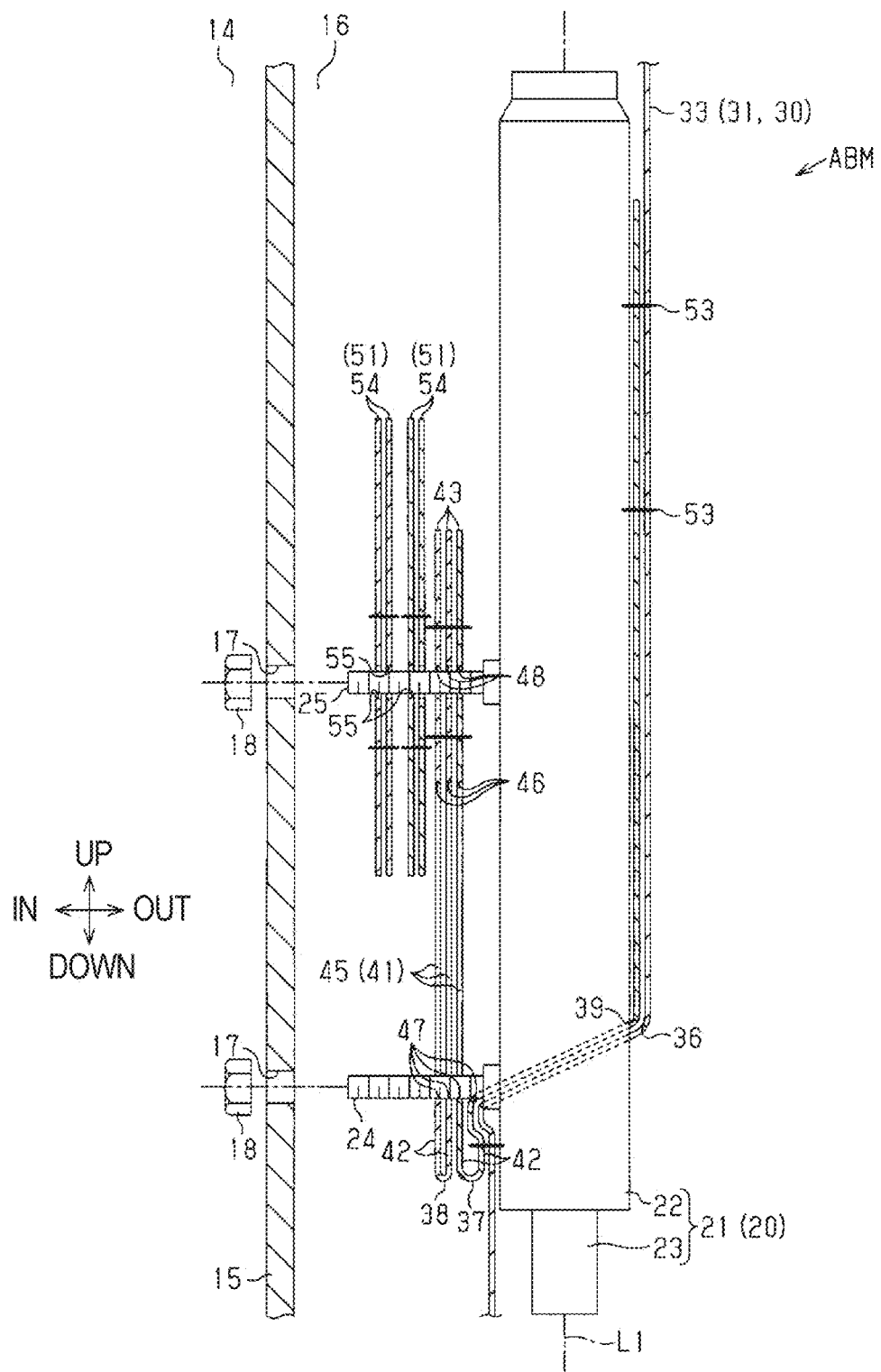
FIG. 5 is a partially sectional view showing a state before the airbag module is installed on a side frame section in the first embodiment.
Figure 6:
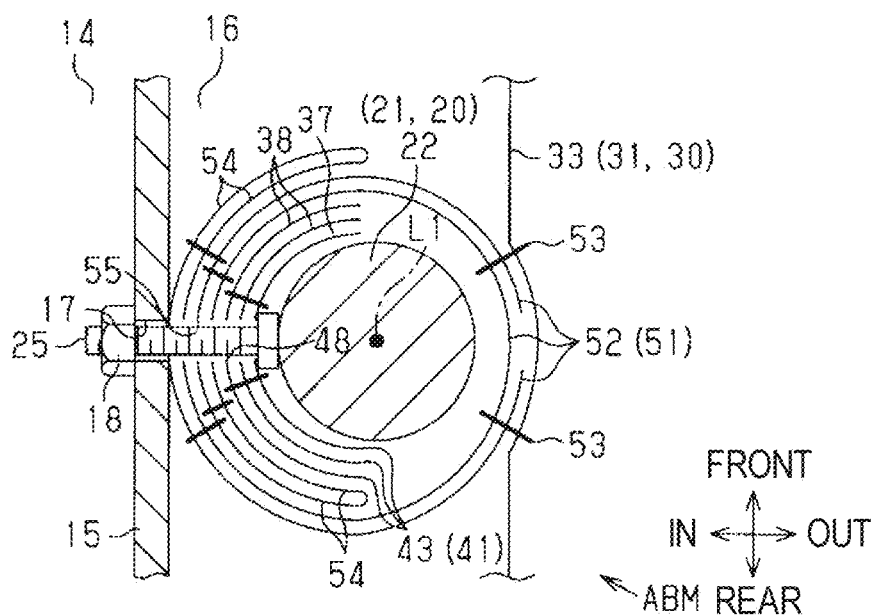
FIG. 6 is a partially sectional top view showing a state when the airbag module has been installed on the side frame section in the first embodiment.

A seat frame forming the framework of the seat back 14 is disposed inside the seat back 14. A part of the seat frame is composed of a side frame section 15 disposed on the vehicle exterior side portion inside the seat back 14 as shown in FIGS. 5 and 6.

A storage section 16 is provided inside the seat back 14 at a position on the side frame section 15 adjacent to the vehicle exterior side, and an airbag module ABM constituting the main section of the side airbag device is assembled in the storage section. The airbag module ABM is equipped with a gas generator 20 and an airbag 30 as main components. Next, these respective components will be described.

<Gas Generator 20>

The gas generator 20 is composed of a generator body 21 and one or more installing protrusions for installing the generator body 21 on the side frame section 15 together with the airbag 30

The generator body 21 is generally referred to as an inflator and is equipped with a gas generation section 22 and a gas injection section 23, each having a cylindrical shape and extended in a nearly up-down direction along the axial line L1 thereof. Inside the gas generation section 22, a gas generating agent (not shown) for generating inflation gas is stored inside the gas generation section 22. The gas injection section 23, smaller than the gas generation section 22 in diameter, is provided coaxially with the gas generation section 22 in a state of being adjacent to the lower side of the gas generation section 22. The outer peripheral section of the gas injection section 23 is provided with a plurality of gas injection ports (not shown) for injecting the inflation gas. Furthermore, a harness (not shown) serving as wiring for inputting operation signals to the generator body 21 is connected to the end section (the upper end section) of the gas generation section 22 on the opposite side of the gas injection section 23.

The generator body 21 in which the gas generating agent is used as described above is generally referred to as a pyro type. However, as the generator body 21, instead of this pyro type, a type (hybrid type) may be used in which the partition wall of a gas cylinder filled with high-pressure inflation gas is broken by gunpowder or the like and the inflation gas is injected.

On the outer peripheral face of the gas generation section 22 and at two positions separated from each other in the direction (upward) along the axial line L1 of the generator body 21 away from the gas injection section 23, the installing protrusions are provided so as to protrude in the same directions orthogonal to the axial line L1. The outer peripheral face of the gas generation section 22 corresponds to the outer face of the gas generation section 22 around the axial line L1. Each of the installing protrusions is formed of a bolt in the first embodiment. The installing protrusion close to the gas injection section 23 is referred to as a first installing protrusion 24 and the installing protrusion away from the gas injection section 23 is referred to as a second installing protrusion 25 to distinguish between the two installing protrusions. As the first installing protrusion 24 and the second installing protrusion 25, those having the same length may be used or those having different lengths may be used.

<Airbag 30>

Figure 4:
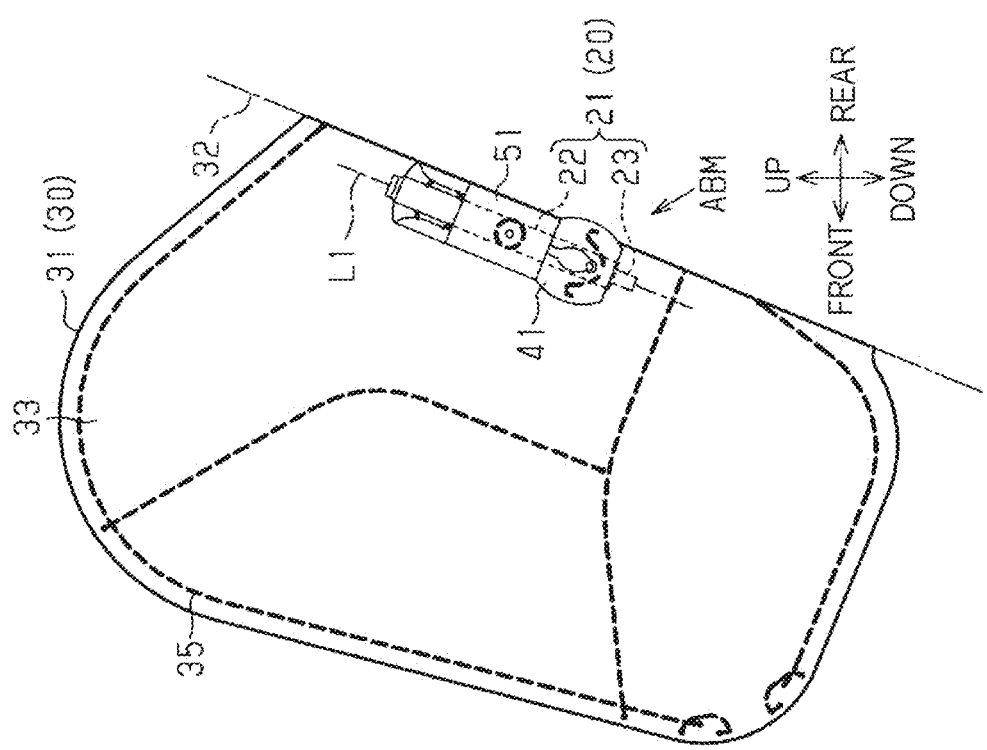
FIG. 4 is a side view showing an airbag module according to the first embodiment, as viewed from the vehicle interior side.

FIG. 4 shows the airbag module ABM in which the airbag 30 is in a state of being flatly developed without being inflated by the injection of the inflation gas (hereafter referred to as "developed and non-inflated state") as viewed from the vehicle interior side.

As shown in FIGS. 1 to 4, the airbag 30 is equipped with a bag body 31 that is developed and inflated by the inflation gas supplied from the gas injection section 23. The bag body 31 is formed by folding a cloth (also referred to as a base cloth, a panel cloth, etc.) in two along a folding line 32 having been set at the central section thereof in the width direction, by overlapping the two portions in the vehicle width direction and by joining the overlapped portions. The portion positioned on the vehicle interior side is herein referred to as a body cloth section 33 and the portion positioned on the vehicle exterior side is herein referred to as a body cloth section 34 to distinguish between the two overlapped portions of the bag body 31. The body cloth sections 33 and 34 overlapped with each other are aligned in the thickness direction and the vehicle width direction.

A material having high strength and flexibility and being capable of being easily folded, such as a woven cloth formed using a polyamide yarn, a polyester yarn, etc. is appropriate for the bag body 31.

The above-mentioned joining between the two body cloth sections 33 and 34 is performed at the peripheral edge joint sections 35 provided at the peripheral edge sections of the body cloth sections. In the first embodiment, the peripheral edge joint sections 35 are formed by sewing (sewing with a sewing thread) the portions of the peripheral edge sections of both the body cloth sections 33 and 34, except for, for example, the rear end sections (the portions in the vicinity of the folding line 32) thereof. Joint sections 44 and 53 described later are also joined similarly by sewing as described above. Moreover, in this respect, side edge joint sections 72, an end edge joint section 73, a peripheral edge joint section 83 and guide joint sections 84 in a second embodiment are also joined similarly.

With respect to the above-mentioned sewing, sewn portions are indicated by two kinds of lines in FIG. 4, FIGS. 8 to 13, FIG. 18, FIG. 19, FIG. 21, FIGS. 23 to 25 and FIG. 26B. A first kind of line is a line (a kind of broken line) formed by intermittently arranging thick lines each having a constant length and indicates a sewn portion as viewed from the vehicle exterior side or the vehicle interior side (see, for example, the peripheral edge joint section 35 in FIG. 4). A second kind of line is a line formed by intermittently arranging thin lines each having a constant length (longer than the length of a general broken line) and indicates the state of a sewing thread, for example, located at the back of a cloth piece and not visible directly (hidden) (see, for example, the joint section 53 in FIG. 13.).

However, the peripheral edge joint section 35 may be formed using a means different from the above-mentioned sewing using the sewing thread, for example, bonding using an adhesive. In this respect, the joint sections 44 and 53, the side edge joint sections 72, the end edge joint section 73, the peripheral edge joint section 83 and the guide joint sections 84 are also formed similarly.

What's more, inside the bag body 31, partition sections for partitioning the inside into a plurality of chambers (inflation chambers), members for regulating the flow of the inflation gas, etc. are provided as portions of the components of the airbag 30.

As shown in FIGS. 5, 12 and 13, an insertion port 36 having a size allowing the gas injection section 23 of the gas generator 20 to pass through and not allowing the portions of the gas generator 20 provided with the first installing protrusion 24 and the second installing protrusion 25 to pass through is open in the rear upper end section of the body cloth section 33 on the vehicle interior side. In the first embodiment, the insertion port 36 is formed into a minimal size allowing the gas generation section 22 to pass through or an equivalent size.

In the gas generator 20, the lower end section thereof from the first installing protrusion 24, that is, the entire gas injection section 23, and a part of the gas generation section 22, more accurately, the portion of the gas generation section 22 on the side of the gas injection section 23 away from the first installing protrusion 24 pass through the insertion port 36 and are disposed inside the bag body 31. The portion of the gas generator 20 on the side of the harness away from the first installing protrusion 24 is disposed outside the bag body 31. The first installing protrusion 24 and the second installing protrusion 25 are included at the portions of the gas generator 20 corresponding thereto. Unlike the configuration described in the above-mentioned JP-A-2017-81248, the first installing protrusion 24 and the second installing protrusion 25 are not inserted into the bag body 31.

As shown in FIGS. 8 and 9, and FIGS. 14A and 14B, one belt 41 and a pair of auxiliary belts 51 are disposed outside the bag body 31, more accurately, on the vehicle interior side of the body cloth section 33 disposed on the vehicle interior side. The belt 41 and both the auxiliary belts 51 are formed using two cloth pieces 38 and 37 made of a material similar to that of the bag body 31.

Both the auxiliary belts 51 are composed of a part of the cloth piece 37, that is, one of the cloth pieces. In the cloth piece 37, at the position overlapped with the above-mentioned insertion port 36 of the bag body 31, an insertion hole 39 having a shape similar to that of the insertion port 36 is provided.

Both the auxiliary belts 51 are disposed outside the bag body 31. The one end sections 52 of both the auxiliary belts 51 are adjacent to each other. Since both the auxiliary belts 51 are composed of a part of the cloth piece 37, both the auxiliary belts 51 are connected to each other at the end sections 52. The one end section 52 of each auxiliary belt 51 is joined to the bag body 31 by the joint section 53.

Figure 10:
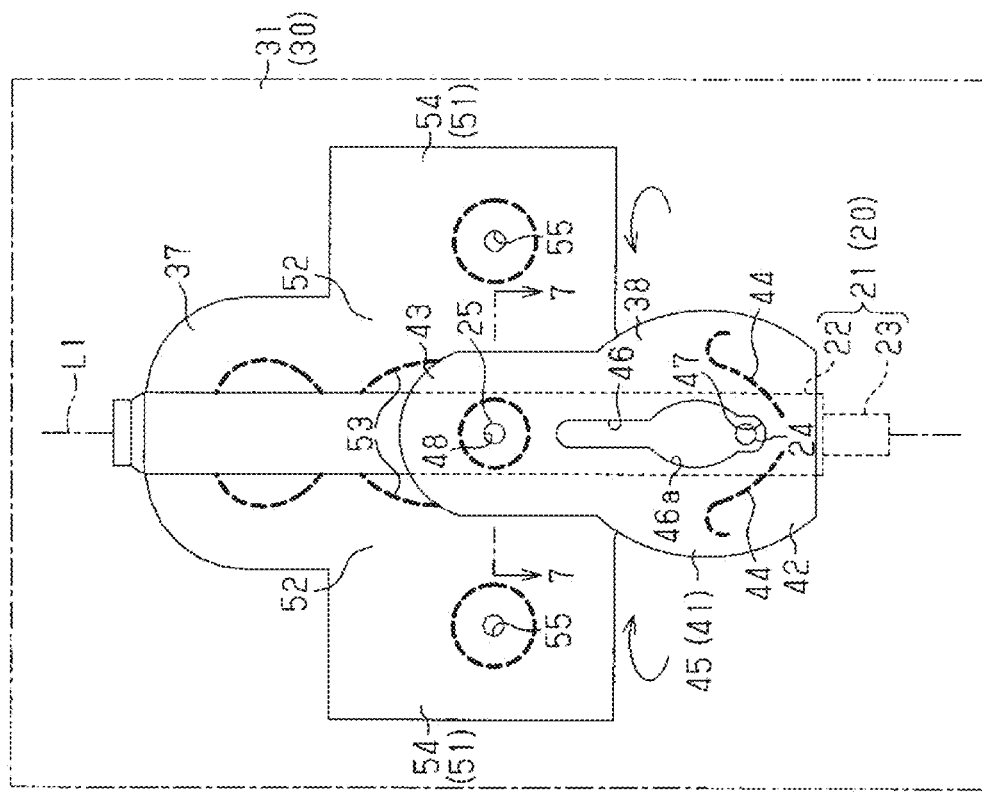
FIG. 10 is a partially sectional side view showing a state when the gas generator is being assembled on the airbag in the first embodiment.
Figure 11:
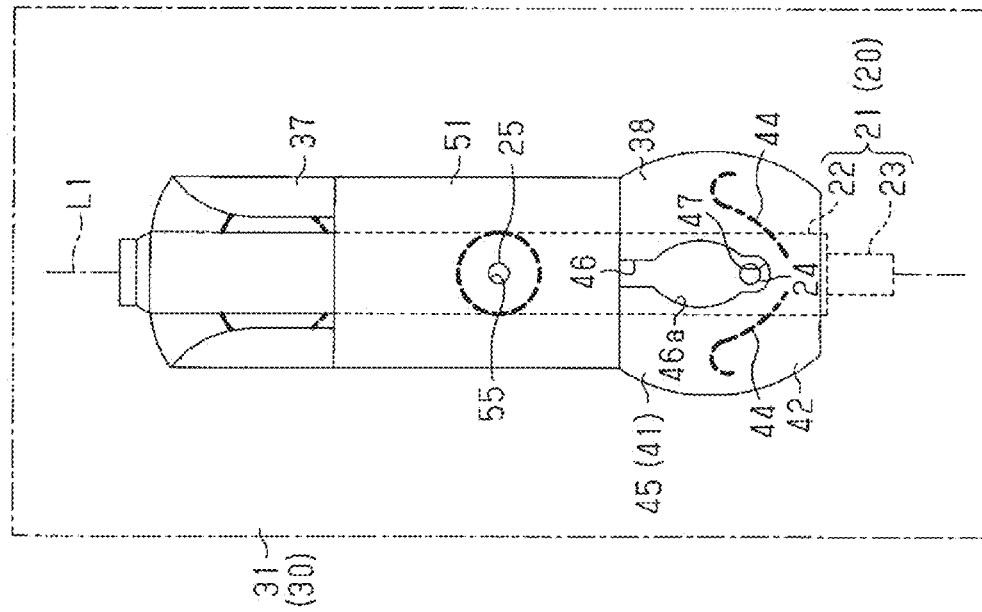
FIG. 11 is a partially sectional side view showing a state when the gas generator has been assembled on the airbag in the first embodiment.

As shown in FIGS. 5, 10 and 11, the respective auxiliary belts 51 are wound on the generator body 21 in directions opposite to each other. The other end sections 54 of the auxiliary belts 51 are engaged at positions away from the one end sections 52 of both the auxiliary belts 51 in the circumferential direction of the generator body 21 of the gas generator 20. More specifically, engaging holes 55 are formed in the other end sections 54 of the auxiliary belts 51. Furthermore, the second installing protrusion 25 is inserted into the respective engaging holes 55, whereby the respective auxiliary belts 51 are engaged with the second installing protrusion 25.

Figure 8:
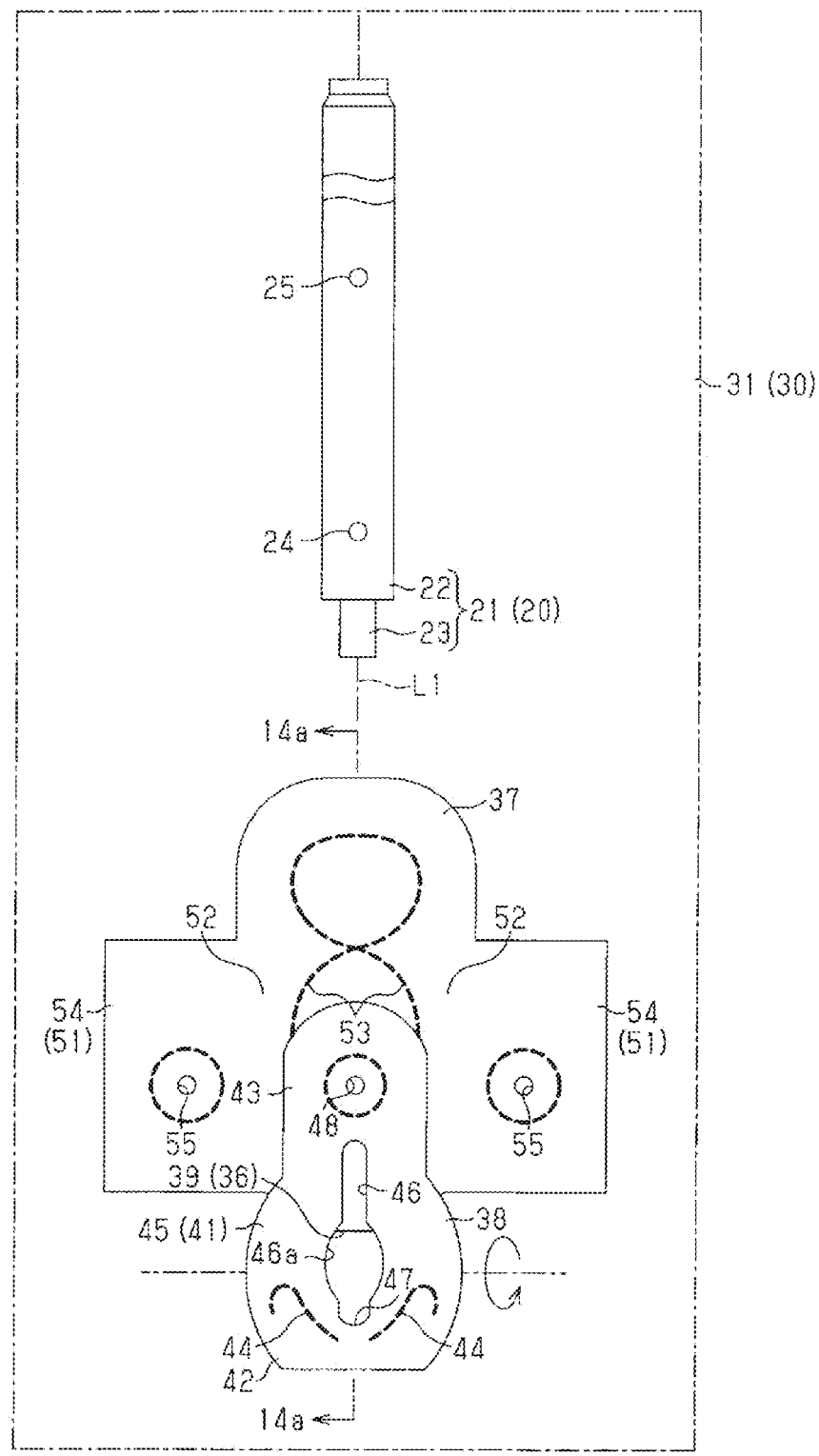
FIG. 8 is a partially sectional side view showing a state before a gas generator is assembled on the airbag in the first embodiment.

As shown in FIG. 8 and FIGS. 14A and 14B, the belt 41 is composed of a part of the above-mentioned cloth piece 37 and the entire cloth piece 38. The part of the above-mentioned cloth piece 37 and the entire cloth piece 38 are overlapped with each other. One end section (the lower section in FIG. 8) of the belt 41 is used as a base end section 42, and the other end section (the upper section in FIG. 8) thereof is used as a tip end section 43. The base end section 42 is joined to the bag body 31 by the joint sections 44 together with the auxiliary belts 51.

The belt 41 is disposed so as to be extended along the axial line L1 of the generator body 21. The area (hereafter referred to as "intermediate section 45") between the base end section 42 and the tip end section 43 of the belt 41 is disposed at the position covering the insertion port 36.

Figure 9:
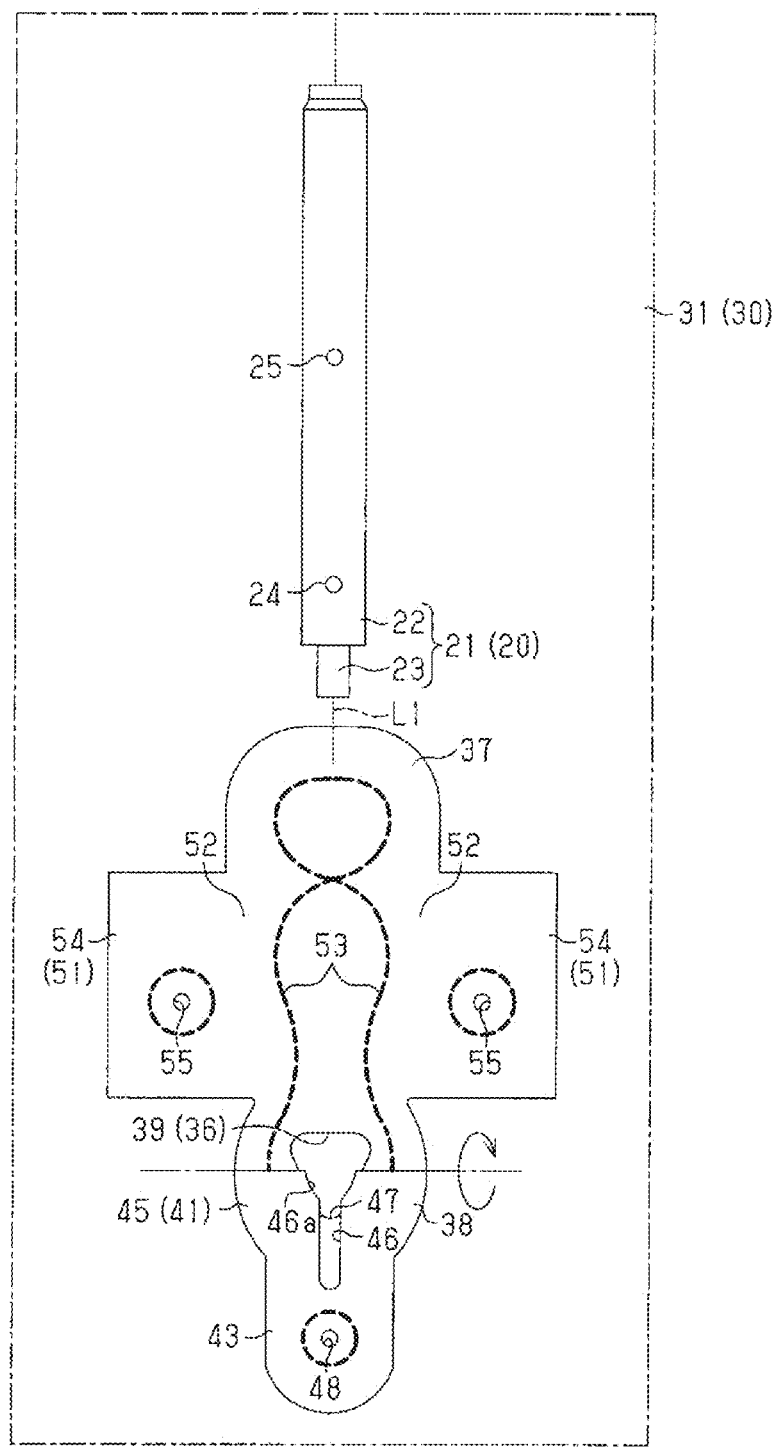
FIG. 9 is a partially sectional side view showing a state when the gas generator is being assembled on the airbag in the first embodiment.

As shown in FIGS. 5 and 11, the belt 41 is hooked to the first installing protrusion 24 at the position adjacent to the base end section 42. More specifically, as shown in FIGS. 8 and 9, the belt 41 is configured so as to be foldable with the base end section 42 joined to the bag body 31 being used as a fulcrum. A slot 46, which is extended from the base end section 42 to the tip end section 43 and into which the first installing protrusion 24 is inserted, is formed in the belt 41. The width of the slot 46 is set so as to be nearly equal to the diameter of the first installing protrusion 24.

The slot 46 is overlapped with the above-mentioned insertion port 36 and the above-mentioned insertion hole 39 at the position where the base end section 42 of the belt 41 is joined to the bag body 31. A positioning section 47 is formed at the position where the slot 46 is overlapped with the insertion port 36 and the insertion hole 39, and the first installing protrusion 24 is engaged with the positioning section 47 in the state in which the gas injection section 23 is inserted into the insertion port 36, whereby the positioning section 47 positions the first installing protrusion 24.

The tip end section 43 of the belt 41 is engaged with the gas generator 20 at a position away from the gas injection section 23. More specifically, an engaging hole 48 is formed in the tip end section 43 of the belt 41. Furthermore, as shown in FIGS. 10 and 11, in the gas generator 20 being in the state in which the first installing protrusion 24 is engaged with the positioning section 47, the second installing protrusion 25 is inserted into the engaging hole 48, whereby the belt 41 is engaged with the second installing protrusion 25.

In the slot 46, a wide section 46a wider than the other portions of the slot 46 is formed at a position adjacent to the positioning section 47. The wide section 46a is provided so that, when the gas injection section 23 and a part of the gas generation section 22 are inserted into the insertion port 36 and the insertion hole 39, the slot 46 does not hinder the insertion.

The airbag 30 being in the developed and non-inflated state (see FIG. 4) is folded, whereby the airbag module ABM is made into a compact storage form, not shown. This makes the airbag module ABM suitable to be stored in the storage section 16 being limited in size in the seat back 14. The airbag module ABM including the folded airbag 30 is maintained in the storage form by a holding means, such as a binding tape (not shown).

The airbag module ABM being maintained in the storage form is disposed in the storage section 16. Moreover, as shown in FIGS. 5 and 6, the first installing protrusion 24 and the second installing protrusion 25 are respectively inserted into the insertion holes 17 provided in the side frame section 15 from the vehicle exterior side. Nuts 18 are respectively fastened to the first installing protrusion 24 and the second installing protrusion 25 from the vehicle interior side, whereby the gas generator 20 is installed on the side frame section 15 together with the gas generator 20.

The side airbag device is equipped with an impact sensor 61 and a controller 62 shown in FIG. 1 in addition to the above-mentioned airbag module ABM. The impact sensor 61 is, for example, composed of an acceleration sensor and detects an impact applied to the side wall section 11 of the vehicle 10 from the side. The controller 62 controls the operation of the generator body 21 on the basis of the detection signal from the impact sensor 61.

Although the vehicle 10 is further equipped with a seatbelt device to restrain an occupant P1 sitting on the vehicle seat 12, this seatbelt device is not shown in FIGS. 1 to 3.

Next, the operation of the side airbag device according to the first embodiment configured as described above will be described.

First, the procedure for assembling the gas generator 20 on the airbag 30 will be described.

At the time of this assembling, as shown in FIGS. 14A and 14B, the belt 41 disposed outside the bag body 31 is folded in the direction indicated by an arrow in FIG. 8 with the base end section 42 joined to the bag body 31 being used as a fulcrum. By this folding, as shown in FIG. 9 and FIGS. 15A and 15B, the tip end side portion of the belt 41 is more separated from the bag body 31 than the base end section 42. At the position where the base end section 42 of the belt 41 is joined to the bag body 31, the positioning section 47 of the slot 46 is overlapped with insertion port 36.

Figure 16:
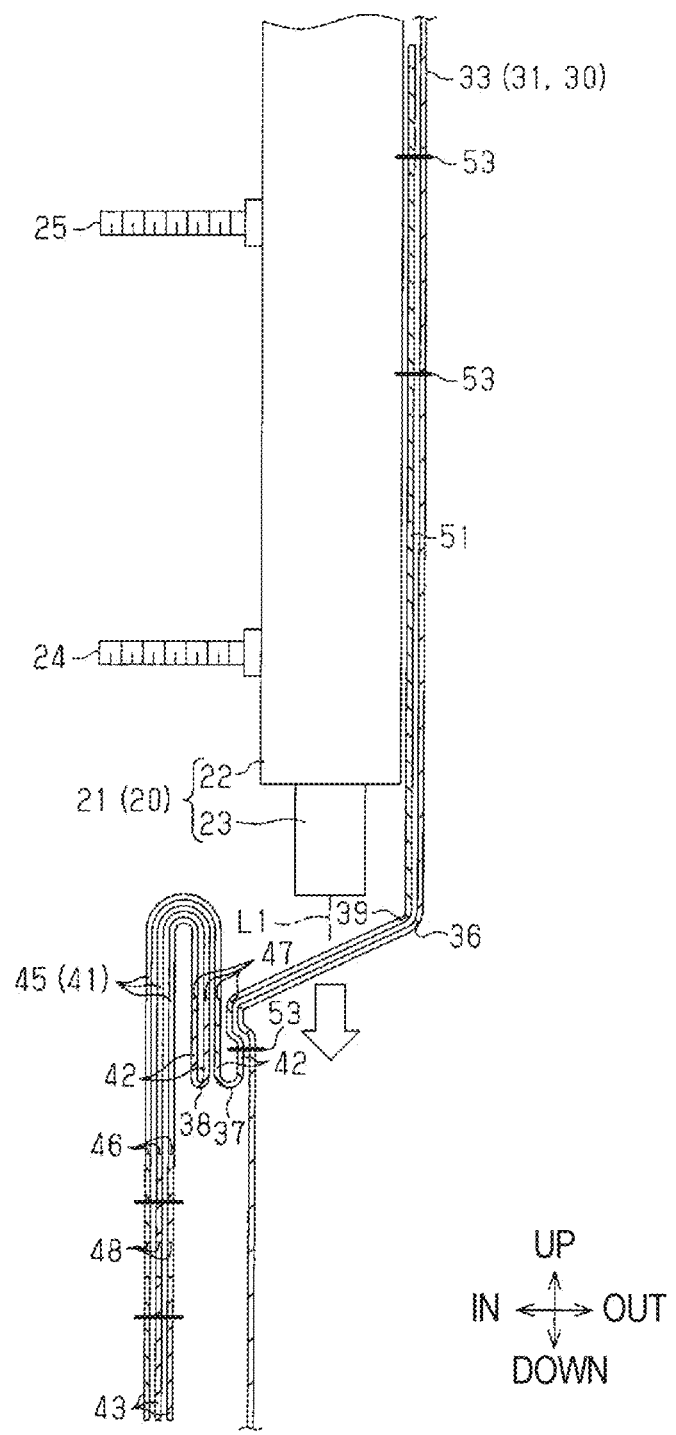
FIG. 16 is a partially sectional view showing a state immediately before the gas injection section is inserted into the insertion port of the bag body shown in FIGS. 15A and 15B.
Figure 17:
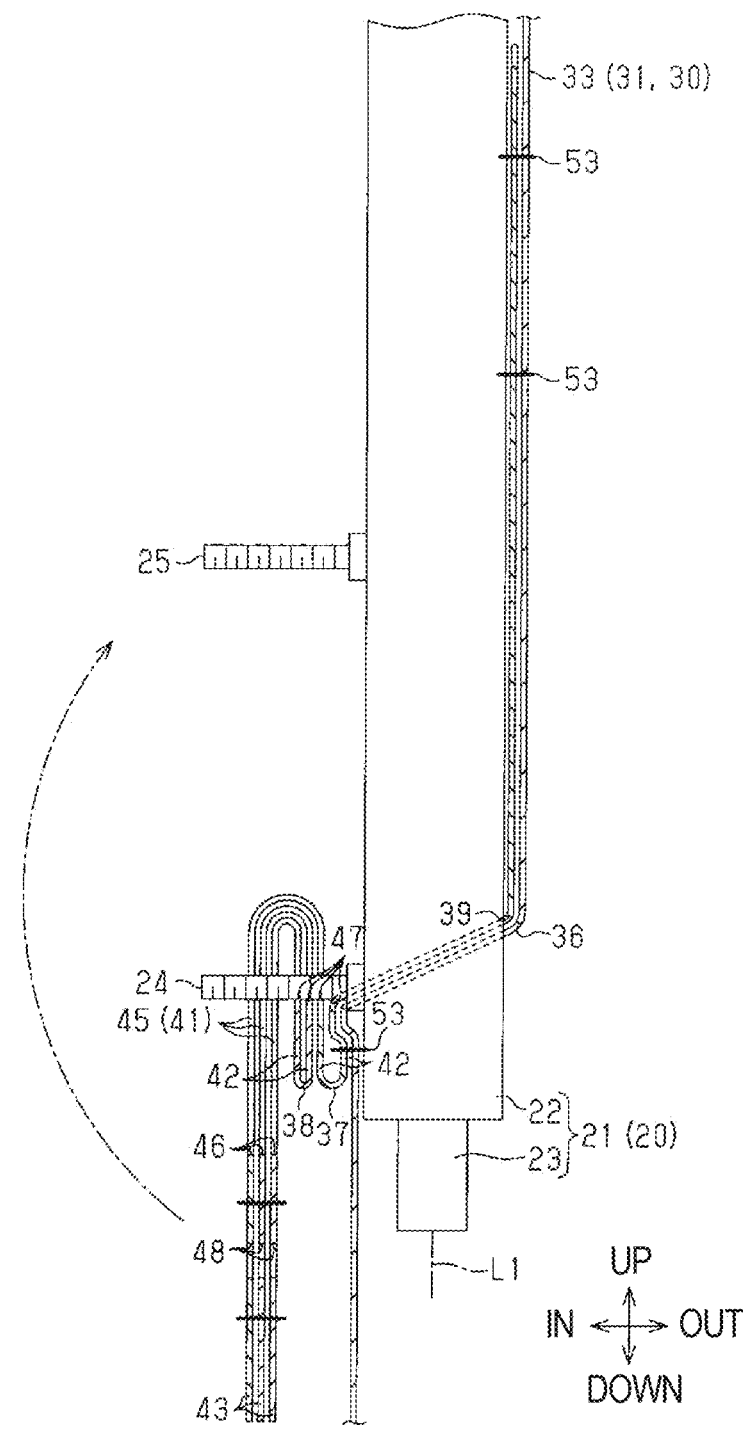
FIG. 17 is a partially sectional view showing a state when the gas injection section is inserted into the insertion port of the bag body and immediately before the belt is folded back.

In this state, as shown in FIGS. 9 and 16, the entire gas injection section 23 and the portion of the gas generation section 22 on the side of the gas injection section 23 away from the first installing protrusion 24 (hereafter referred to as "a part of the gas generation section 22") are inserted into the insertion hole 39 in the cloth piece 37 (the auxiliary belts 51) and the insertion port 36 in the bag body 31 from the outside of the bag body 31. By this insertion, as shown in FIG. 17, the first installing protrusion 24 is moved to the side of the insertion port 36. The gas injection section 23 and the above-mentioned part of the gas generation section 22 pass through the insertion port 36 and the insertion hole 39 and are disposed inside the bag body 31. When the first installing protrusion 24 is engaged with the positioning section 47 of the slot 46, the first installing protrusion 24 is in a state of being positioned with respect to the bag body 31. Both the first installing protrusion 24 located close to the gas injection section 23 and the second installing protrusion 25 located away from the gas injection section 23 are disposed outside the bag body 31.

Hence, the first installing protrusion 24 and the second installing protrusion 25 are not required to be inserted into the bag body 31. As a result, the insertion port 36 may merely have a size allowing the gas injection section 23 and the part of the gas generation section 22 to pass through, thereby not required to have a size allowing the portions of the gas generator 20 provided with the first installing protrusion 24 and the second installing protrusion 25 to pass through. In this respect, in the first embodiment, the insertion port 36 is formed into a size allowing the gas injection section 23 to pass through and not allowing the portions of the gas generator 20 provided with the first installing protrusion 24 and the second installing protrusion 25 to pass through. Consequently, the clearance between the peripheral edge section of the insertion port 36 and the gas generator 20 becomes smaller than that in a configuration in which both the first installing protrusion 24 and the second installing protrusion 25 are inserted into the insertion port 36 (corresponding to JP-A-2017-81248).

Figure 7:
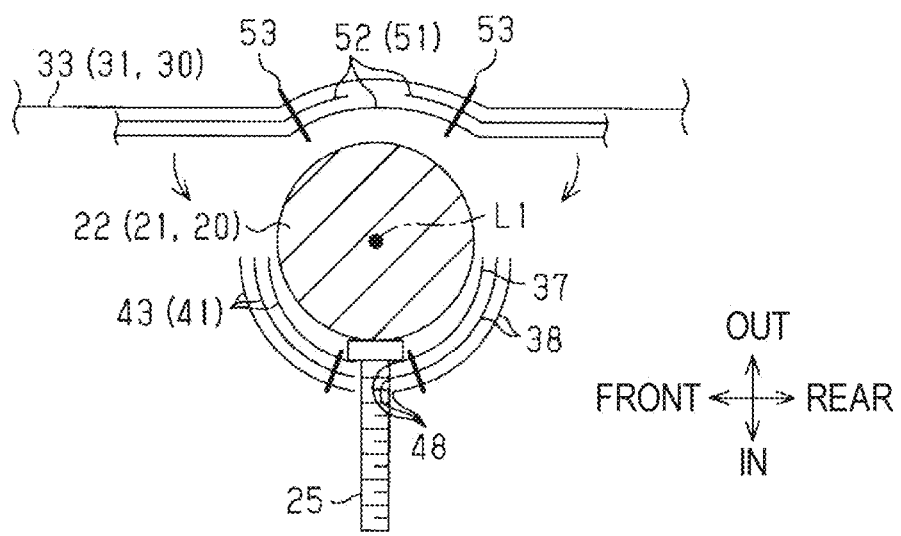
FIG. 7 is a partially sectional view showing a state before auxiliary belts are engaged with a second installing protrusion in the first embodiment, taken on line 7-7 of FIG. 10.

Furthermore, as indicated by arrows in FIGS. 9 and 17, the belt 41 is folded back to the side close to the second installing protrusion 25 with the base end section 42 joined to the bag body 31 being used as a fulcrum. At this time, since the first installing protrusion 24 is inserted into the slot 46, interference between the belt 41 and the first installing protrusion 24 is avoided. Furthermore, the folded-back portion of the belt 41 approaches the second installing protrusion 25, and the second installing protrusion 25 is inserted into the engaging hole 48 in the tip end section 43 of the belt 41 as shown in FIGS. 7 and 10.

By the above-mentioned insertion, the belt 41 is hooked to the first installing protrusion 24 at the position adjacent to the base end section 42 and is engaged with the second installing protrusion 25 at the tip end section 43. Hence, the belt 41 joined to the bag body 31 at the base end section 42 is connected to the gas generator 20 at two positions separated from each other along the axial line L1. The airbag 30 is in a state of being connected to the gas generator 20 via the belt 41. The belt 41 is held between the first installing protrusion 24 and the second installing protrusion 25 in a tensioned state. In the case that the second installing protrusion 25 is extracted from the engaging hole 48, the engagement state of the belt 41 with the second installing protrusion 25 is released.

Moreover, the insertion port 36 is covered with the intermediate section 45 of the belt 41, the base end section 42 of which is joined to the bag body 31 and the tip end section 43 of which is engaged with the gas generator 20. The insertion port 36 is in a state of being blocked with the intermediate section 45 of the belt 41.

Still further, the generator body 21 is regulated from moving with respect to the bag body 31 in the direction along the axial line L1 of the generator body 21, that is, in the direction of coming off from the insertion port 36.

After that, in the pair of auxiliary belts 51 disposed outside the bag body 31 and joined to the bag body 31 with the one end sections 52 thereof being adjacent to each other, the auxiliary belts 51 are wound on the generator body 21 in the directions opposite to each other as indicated by arrows in FIGS. 7 and 10. The second installing protrusion 25 is inserted into the engaging holes 55 formed in the end sections 54 of the respective auxiliary belts 51, whereby the end sections 54 are engaged with the second installing protrusion 25 located away from the end sections 52 of the auxiliary belts 51 in the circumferential direction of the generator body 21 of the gas generator 20. In the case that the second installing protrusion 25 is extracted from the engaging holes 55, the engagement state of the respective auxiliary belts 51 with the second installing protrusion 25 is released.

Next, the action of the side airbag device according to the first embodiment will be described.

In FIGS. 1 and 2, when an impact applied from the side to the side wall section 11 is not detected by the impact sensor 61, an operation signal for operating the generator body 21 is not output from the controller 62 to the generator body 21, and inflation gas is not injected from the gas injection section 23. The airbag 30 remains stored in the storage section 16 together with the gas generator 20 in the storage form (see FIGS. 5 and 6).

On the other hand, when an impact not smaller than a predetermined value is applied, for example, from the side to the side wall section 11 due to a collision or the like and the impact is detected by the impact sensor 61, an operation signal is output from the controller 62 to the generator body 21 on the basis of the detection signal of the impact sensor. The generator body 21 injects the inflation gas from the gas injection section 23 in response to this operation signal.

The inflation gas is supplied to the bag body 31. At this time, since the clearance between the gas generator 20 and each of the peripheral edge sections of the insertion port 36 and the insertion hole 39 is made small, the inflation gas injected from the gas injection section 23 hardly leaks to the outside of the airbag 30 through the clearance in FIG. 5.

Furthermore, the insertion port 36 and the insertion hole 39 are in a state of being blocked by the intermediate section 45 of the belt 41 as described above. Hence, even if the inflation gas has passed through the clearance between the gas generator 20 and each of the peripheral edge sections of the insertion port 36 and the insertion hole 39, the inflation gas cannot leak to the outside of the airbag 30 without passing through the clearance between the belt 41 and the insertion port 36 and the insertion hole 39. Hence, the leakage of the inflation gas to the outside of the airbag 30 is further suppressed in this case than in the case that the insertion port 36 and the insertion hole 39 are not covered with the intermediate section 45 of the belt 41.

The inflation of the bag body 31 is started by the inflation gas supplied as described above. The airbag 30 jumps forward from the seat back 14 while part thereof (the rear section) is left inside the storage section 16.

The airbag 30 to which the inflation gas is being supplied thereafter is inflated forward while being unfolded (developed) between the side wall section 11 and the upper half of the occupant P1 sitting on the vehicle seat 12 as indicated by the two-dot chain lines in FIGS. 1 to 3. Also during this time, the amount of the inflation gas leaking from the clearance between the gas generator 20 and each of the peripheral edge sections of the insertion port 36 and the insertion hole 39 to the outside of the bag body 31 is scarce.

The airbag 30 having been developed and inflated as described above is interposed between the upper half of the occupant P1 and the side wall section 11 advancing toward the vehicle interior side. The upper half is pressed toward the vehicle interior side and restrained by the airbag 30. As a result, the impact transmitted from the side to the upper half via the side wall section 11 is relieved by the airbag 30 and the upper half is protected.

In the first embodiment, as shown in FIGS. 5 and 11, the airbag 30 is connected to the gas generator 20 via the auxiliary belts 51. Hence, when the bag body 31 is developed and inflated by the inflation gas injected from the gas injection section 23, the bag body 31 is regulated by the auxiliary belts 51 from swinging with the insertion port 36 into which the gas injection section 23 is inserted being used as a fulcrum.

In particular, the pair of auxiliary belts 51 is used in the first embodiment. Both the auxiliary belts 51 are wound on the generator body 21 in the directions opposite to each other in the circumferential direction of the generator body 21. Hence, when the bag body 31 is developed and inflated, the auxiliary belts 51 can regulate the above-mentioned swinging of the bag body 31 more effectively in this case than in the case in which the number of the auxiliary belts 51 is one.

As shown in FIGS. 2 and 3, the clearance between the side wall section 11 of the vehicle 10 and the occupant P1 sitting on the vehicle seat 12 is small. In addition, when an impact is applied from the side to the side wall section 11 due to a collision or the like, the side wall section 11 is deformed to the vehicle interior side, whereby the above-mentioned clearance between the side wall section 11 and the occupant P1 becomes smaller. The airbag 30 is required to be developed and inflated in a short time in order that the airbag 30 is developed and inflated in this small clearance. Hence, it is important to reduce the amount of the inflation gas leaking to the outside of the airbag 30.

In this respect, in the first embodiment, the first installing protrusion 24 and the second installing protrusion 25 are disposed outside the bag body 31 as described above, whereby the clearance between the gas generator 20 and each of the peripheral edge sections of the insertion port 36 and the insertion hole 39 is made small and the leakage amount of the inflation gas to the outside of the airbag 30 is reduced. Hence, even if the clearance between the side wall section 11 and the occupant P1 is small, the airbag 30 can be developed and inflated in a short time and the occupant P1 can be protected from the impact appropriately.

With the first embodiment, the following effect is obtained in addition to those described above.

In the above-mentioned JP-A-2017-81248, the engaging holes are provided in the bag body, and the pair of bolts protruding from the generator body disposed inside the airbag is inserted into the engaging holes. Hence, some clearances occur between the peripheral edge sections of the engaging holes and the bolts. It is thus possible that the inflation gas may leak through these clearances.

In this respect, in the first embodiment, the bag body 31 is not provided with engaging holes for allowing the first installing protrusion 24 and the second installing protrusion 25 to be inserted. Hence, a phenomenon in which the inflation gas leaks through the clearances between the peripheral edge sections of such engaging holes and the first installing protrusion 24 and the second installing protrusion 25 does not occur. This is advantageous in suppressing the leakage of the inflation gas to the outside of the airbag 30.

Second Embodiment

Next, a second embodiment being embodied as a side airbag device for a vehicle will be described below referring to FIGS. 18 to 26.

The second embodiment is different from the first embodiment in the structure of assembling the gas generator 20 on the airbag 30.

Figure 20:
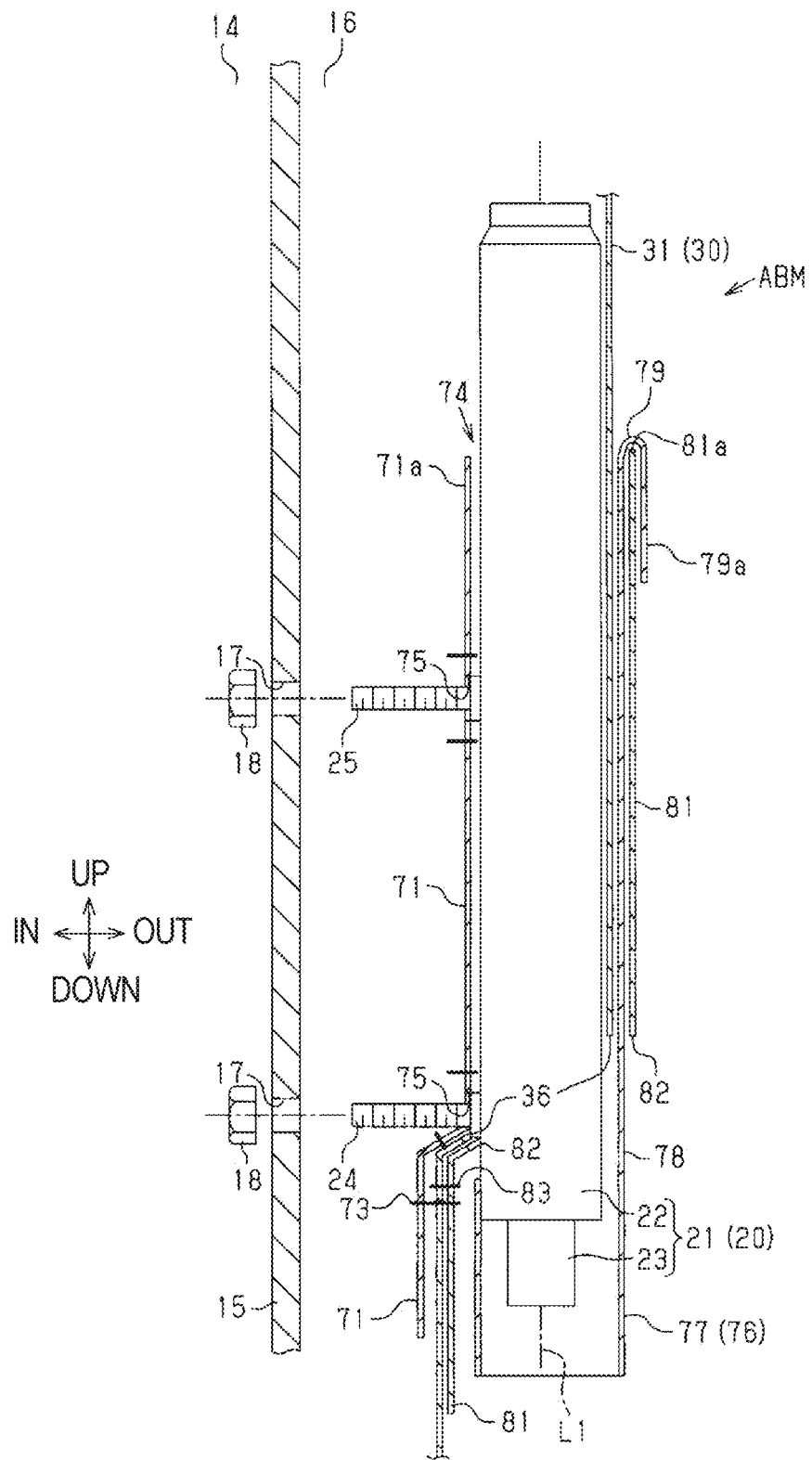
FIG. 20 is a partially sectional view showing a state before the airbag module of the airbag is installed on the side frame section in the second embodiment.

As shown in FIG. 20, as in the first embodiment, the gas generator 20 equipped with the generator body 21 having the gas injection section 23, the first installing protrusion 24 and the second installing protrusion 25 is used. Furthermore, a nearly circular insertion port 36 having a size allowing the gas injection section 23 to pass through and not allowing the portions of the gas generator 20 provided with the first installing protrusion 24 and the second installing protrusion 25 to pass through is open in the bag body 31. The insertion port 36 is formed into a minimal size allowing the gas generation section 22 to pass through or an equivalent size.

Figure 23:
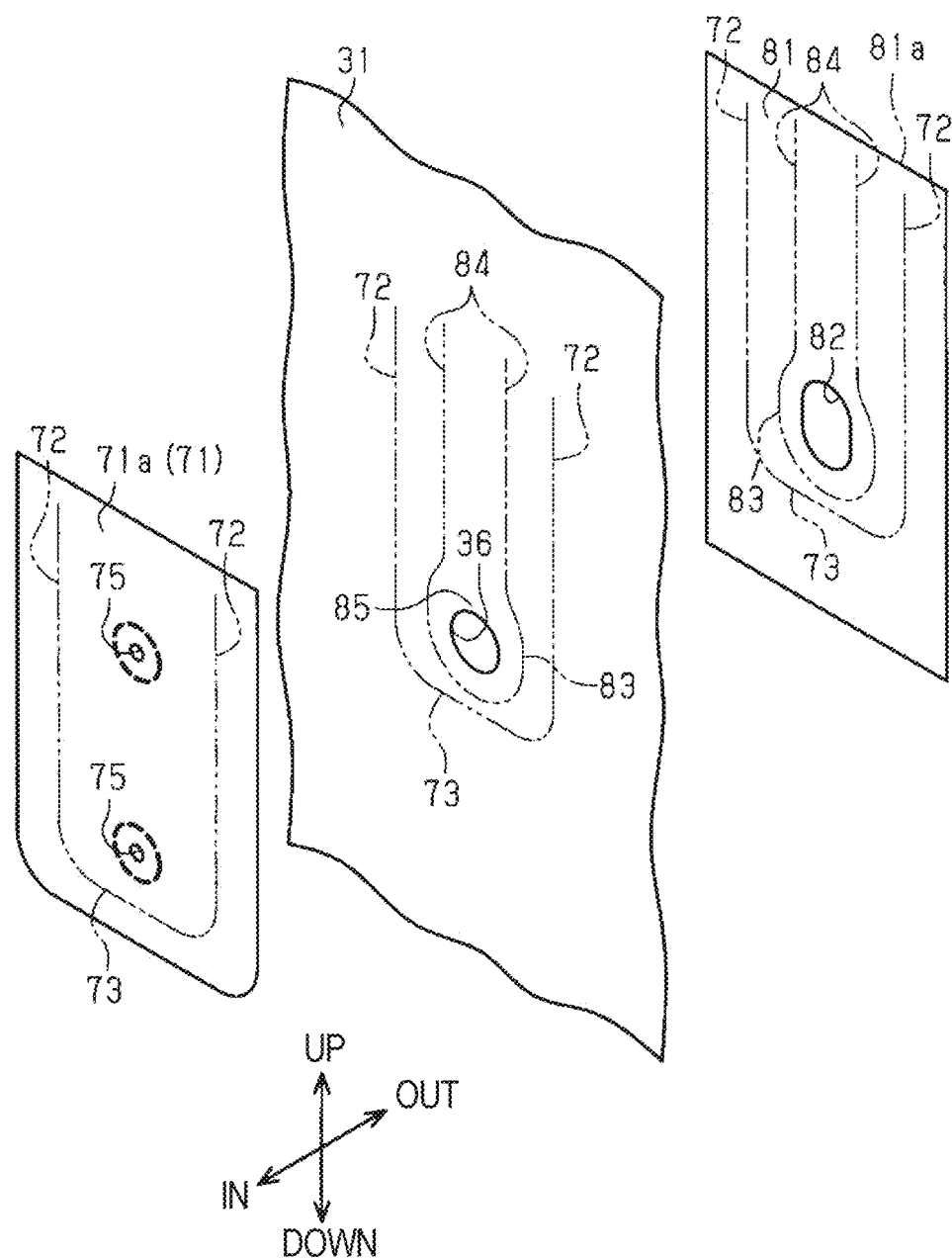
FIG. 23 is an exploded perspective view showing a part of the bag body, a cover cloth and the inside cloth in the second embodiment.

As shown in FIGS. 20 and 23, a cover cloth 71 being vertically long and having a nearly rectangular shape is disposed outside the bag body 31 and at least at the position covering the insertion port 36. The cover cloth 71 is formed of a material similar to that of the bag body 31. The cover cloth 71 is joined to the bag body 31 using a joint section. The joint section is composed of a pair of side edge joint sections 72 and an end edge joint section 73. Both the side edge joint sections 72 are separated from each other and extended in the up-down direction, that is, the direction along the axial line L1 of the generator body 21. The end edge joint section 73 is extended in a direction crossing the above-mentioned axial line L1 (orthogonal thereto in the second embodiment) and connected to the lower end sections of both the side edge joint sections 72.

The area between the bag body 31 and upper end section 71a of the cover cloth 71 serving as the end section on the side away from the insertion port 36 in the direction along the axial line L1 is used as an insertion section 74 into which the gas generator 20 is inserted.

The insertion port 36 is located in the bag body 31 at the position sandwiched between both the side edge joint sections 72. The insertion port 36 is covered with the portion sandwiched between both the side edge joint sections 72 of the cover cloth 71. Engaging holes 75 are formed at two positions separated from each other in the up-down direction and sandwiched between both the side edge joint sections 72 in the cover cloth 71. These engaging holes 75 are not formed in the bag body 31.

The gas injection section 23 of the gas generator 20 is inserted into the insertion port 36, passes through the insertion port 36 and is disposed inside the bag body 31. As shown in FIGS. 19 and 20, the first installing protrusion 24 and the second installing protrusion 25 are disposed outside the bag body 31 and inserted into the engaging holes 75 corresponding thereto. The cover cloth 71 is engaged with the first installing protrusion 24 and the second installing protrusion 25 by these insertions. At least the portions of the generator body 21 provided with the first installing protrusion 24 and the second installing protrusion 25 are disposed between the cover cloth 71 and the bag body 31 and in the area sandwiched between both the side edge joint sections 72, and covered with the cover cloth 71. In the second embodiment, the major part of the generator body 21 excluding the upper section is covered with the cover cloth 71.

As shown in FIGS. 20 to 22, an insertion assisting tool 76 is disposed at the position corresponding to the gas generator 20. The insertion assisting tool 76 has a cylindrical section 77, a plate section 78 and a regulating section 79. The insertion assisting tool 76 is made of a material having heat resistance higher than that of the bag body 31, a metallic material in this embodiment. The cylindrical section 77 is open at both the ends and has a cylindrical shape having a diameter larger than that of the insertion port 36, thereby being unable to pass through the insertion port 36. The cylindrical section 77 is disposed at a position adjacent to the lower side of the insertion port 36. The cylindrical section 77 covers at least the gas injection section 23 of the gas generator 20. In the second embodiment, the cylindrical section 77 covers the entire gas injection section 23 and also covers a part of the gas generation section 22. The part of the gas generation section 22 is herein a portion of the gas generation section 22 located lower than the first installing protrusion 24 and adjacent to the gas injection section 23.

The plate section 78 is extended in the up-down direction along the axial line L1 from the peripheral edge section of the cylindrical section 77 on the side away from the cover cloth 71 in the radial direction of the cylindrical section 77 to the upper side, that is, the opposite side of the gas injection section 23 with the insertion port 36 placed therebetween, and held on the bag body 31.

The regulating section 79 is provided on the upper end section, that is, the end section of the plate section 78 on the opposite side of the cylindrical section 77. The regulating section 79 has a folded section 79a on the opposite side of the bag body 31. The folded section 79a is folded downward at the upper end section of the plate section 78.

Figure 24:
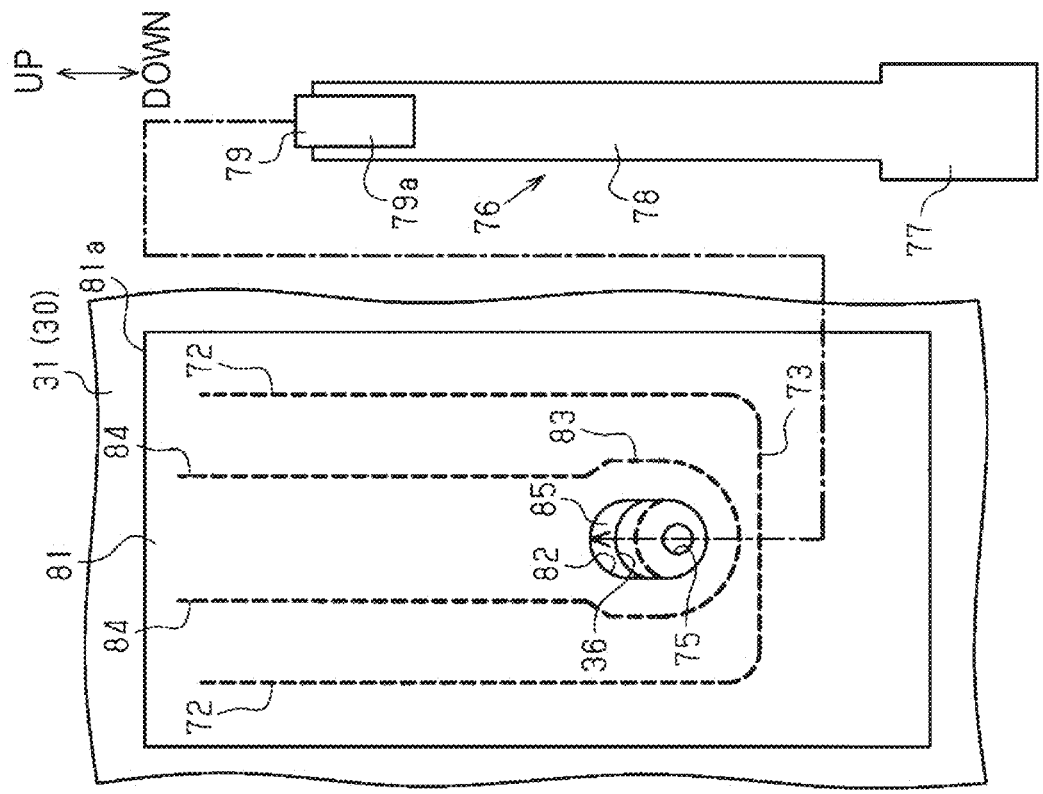
FIG. 24 is a partial rear view showing a state before the insertion assisting tool is assembled on the bag body and the inside cloth in the second embodiment.

As shown in FIGS. 23 and 24, an inside cloth 81 being vertically long and having a nearly rectangular shape is disposed at the position corresponding to the cover cloth 71 inside the bag body 31. The inside cloth 81 is formed of a material similar to that of the bag body 31. At the position of the inside cloth 81 opposed to the insertion port 36, an inner insertion port 82 is formed so as to communicate with the insertion port 36. The inner insertion port 82 is formed longer than the insertion port 36 to the upper side, that is, the side away from the cylindrical section 77 of the insertion assisting tool 76.

The inside cloth 81 is joined to the bag body 31 using a joint section. The joint section is composed of a pair of side edge joint sections, an end edge joint section, the peripheral edge joint section 83 and the pair of guide joint sections 84. Both the side edge joint sections are extended in the up-down direction in a state of being separated from each other and composed of the above-mentioned side edge joint sections 72. The end edge joint section is extended in a direction crossing the above-mentioned axial line L1 (orthogonal thereto) and is connected to the lower end section of both the side edge joint sections 72 and is composed of the above-mentioned end edge joint section 73. The inside cloth 81 is joined (sewn together) to the bag body 31 by using both the side edge joint sections 72 and the end edge joint section 73 for joining the cover cloth 71 to the bag body 31 as described above.

The peripheral edge joint section 83 has a nearly circular arc shape and encloses the insertion port 36 and the inner insertion port 82. Both the guide joint sections 84 are provided at positions so as to sandwich the plate section 78 from both the sides in the width direction thereof. Both the guide joint sections 84 are parallel to each other and extended in the up-down direction, that is, the length direction of the plate section 78. The end sections of the guide joint sections 84 on the sides of the insertion port 36 and the inner insertion port 82, that is, the lower end sections thereof, are connected to the end section of the above-mentioned peripheral edge joint section 83.

The plate section 78 of the insertion assisting tool 76 is inserted between the peripheral edge portion of the insertion port 36 in the bag body 31 and the peripheral edge portion of the inner insertion port 82 in the inside cloth 81 and is disposed in the area between the bag body 31 and the inside cloth 81, that is, in the area sandwiched between both the guide joint sections 84, thereby being held by the bag body 31.

Moreover, the regulating section 79 of the insertion assisting tool 76 is exposed from the area between the bag body 31 and the inside cloth 81 and is located close to the inside cloth 81. The folded section 79a of the regulating section 79 is configured such that the inside cloth 81 is sandwiched between the folded section 79a and the plate section 78.

The configurations other than those described above are similar to those of the first embodiment. Hence, the components similar to those described in the first embodiment are designated by the same reference numerals and signs and their overlapped descriptions are omitted.

Next, operation and effects in the second embodiment will be described.

First, the procedure for assembling the insertion assisting tool 76 on the airbag 30 will be described. This assembling is performed before the gas generator 20 is assembled on the airbag 30.

As shown in FIGS. 24 and 26A, the plate section 78 and the regulating section 79 of the insertion assisting tool 76 are inserted between the peripheral edge portion of the insertion port 36 in the bag body 31 and the peripheral edge portion of the inner insertion port 82 in the inside cloth 81 and are disposed in the area between the bag body 31 and the inside cloth 81, that is, in the area sandwiched between both the guide joint sections 84.

Since the inner insertion port 82 is formed longer than the insertion port 36 to the upper side, part (the upper part) of the peripheral edge portion of the insertion port 36 in the bag body 31 is located on the outside of the portion of the inner insertion port 82 by which the inner insertion port 82 is longer than the insertion port 36. This portion 85 (see FIG. 23) functions as a marker at the time when the plate section 78 and the regulating section 79 are inserted between the bag body 31 and the inside cloth 81. The position where the plate section 78 and the regulating section 79 are inserted between the bag body 31 and the inside cloth 81 can be simply recognized by this marker. What's more, the plate section 78 and the regulating section 79 can be simply inserted into the area between the bag body 31 and the inside cloth 81 and the area sandwiched between the guide joint sections 84 by contacting the upper end section of the plate section 78 with the above-mentioned portion 85 and by sliding the plate section 78 upward.

Both the guide joint sections 84 have a function of guiding the insertion of the plate section 78 and the regulating section 79 into the area between the bag body 31 and the inside cloth 81. The above-mentioned insertion is performed until the entire regulating section 79 is exposed from the area between the bag body 31 and the inside cloth 81. After the entire regulating section 79 has been exposed, the insertion assisting tool 76 is slid downward. As a result, the upper section of the inside cloth 81 is sandwiched between the plate section 78 and the folded section 79a of the regulating section 79. In this state, as shown in FIG. 21, the plate section 78 is made to have a posture being extended from the cylindrical section 77 to the opposite side of the gas injection section 23 with the insertion port 36 disposed therebetween in the direction along the axial line L1, and sandwiched between the bag body 31 and the inside cloth 81, thereby being held on the bag body 31. Hence, no special structure is required to hold the plate section 78 on the bag body 31. Furthermore, the plate section 78 can be held on the bag body 31 by performing a simple operation of inserting the plate section 78 and the regulating section 79 into the area between the bag body 31 and the inside cloth 81 and the area sandwiched between the both the guide joint sections 84. In the state of being held, the plate section 78 is regulated from moving in the width direction by both the guide joint sections 84.

The regulating section 79 exposed from the area between the bag body 31 and the inside cloth 81 makes contact with the upper end edge 81a of the inside cloth 81, thereby regulating the movement of the plate section 78 to the lower side (the side of the cylindrical section 77). Hence, the regulating section 79 can regulate the plate section 78 from coming off downward from between the bag body 31 and the inside cloth 81.

Since the cylindrical section 77 is larger than the insertion port 36 in diameter and cannot pass through the insertion port 36, the cylindrical section 77 makes contact with the peripheral portion of the inner insertion port 82, whereby the movement of the insertion assisting tool 76 to the upper side is regulated. Hence, the plate section 78 is regulated by the cylindrical section 77 from coming off upward from between the bag body 31 and the inside cloth 81.

As described above, in the state in which the insertion assisting tool 76 is held on the bag body 31, the cylindrical section 77 is located at the position adjacent to the lower sides of the insertion port 36 and the inner insertion port 82 as shown in FIGS. 26A and 26B. The plate section 78 is extended from the peripheral edge section of the cylindrical section 77 on the side away from the cover cloth 71 in the radial direction of the cylindrical section 77. Hence, at least the peripheral portion of the insertion port 36 in the bag body 31 and at least the peripheral portion of the inner insertion port 82 in the inside cloth 81 are deformed by the cylindrical section 77 and the plate section 78 so as to be away from the cover cloth 71 to the inside of the bag body 31.

Next, the procedure for assembling the gas generator 20 on the airbag 30 will be described. This assembling is performed for the airbag 30 on which the insertion assisting tool 76 has been assembled as described above. Furthermore, this assembling can be performed in the state in which the airbag 30 has been folded, for example, in a state equivalent to the state in which the airbag has the above-mentioned storage form (the state before the gas generator 20 is assembled).

Figure 25:
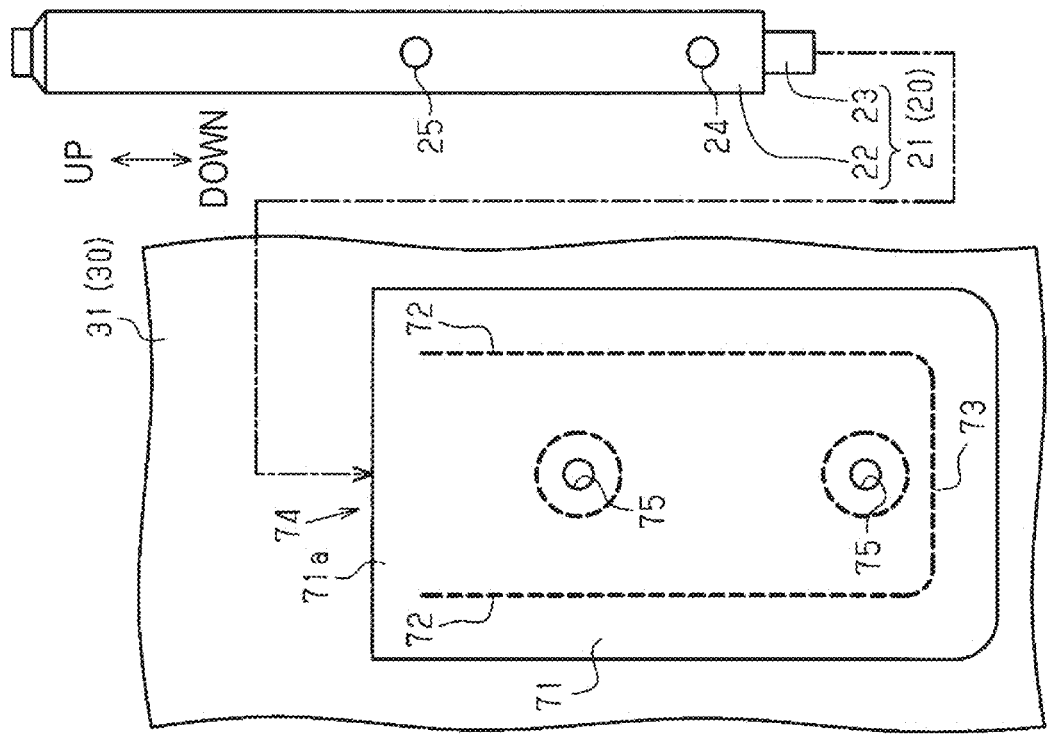
FIG. 25 is a partial rear view showing a state before the gas generator is assembled between the bag body and the cover cloth in the second embodiment.

At the time of this assembling, the cover cloth 71 is picked and moved away from the bag body 31, whereby the insertion section 74 is expanded (largely opened) as shown in FIG. 25 and FIGS. 26A and 26B.

The gas generator 20 is inserted between the bag body 31 and the cover cloth 71 through the insertion section 74 having been expanded as described above in the order of the gas injection section 23 and the gas generation section 22.

In this insertion process, at least the portions of the generator body 21 provided with the first installing protrusion 24 and the second installing protrusion 25 enter the area between the cover cloth 71 and the bag body 31 and the area sandwiched between both the side edge joint sections 72. In other words, at least the portions of the generator body 21 provided with the first installing protrusion 24 and the second installing protrusion 25 are disposed outside the bag body 31 and covered with the cover cloth 71 that is joined to the bag body 31. With the above-mentioned insertion, the gas injection section 23 approaches the insertion port 36 and the inner insertion port 82, and the first installing protrusion 24 and the second installing protrusion 25 approach the engaging holes 75 corresponding thereto.

Furthermore, in the above-mentioned insertion process, the gas injection section 23 is inserted into the insertion port 36 of the bag body 31 and the inner insertion port 82 of the inside cloth 81 in this order and passes through the insertion port 36 and the inner insertion port 82, thereby being disposed inside the bag body 31. The gas injection section 23 and the lower end section of the gas generation section 22 enter the inside of the cylindrical section 77.

At this time, at least the peripheral portion of the insertion port 36 in the bag body 31 and at least the peripheral portion of the inner insertion port 82 in the inside cloth 81 have been deformed by the insertion assisting tool 76 as described above so as to be away from the cover cloth 71 to the inside of the bag body 31. The insertion port 36 is in a state of being inclined with respect to the axial line L1 of the gas generator 20. Hence, the gas injection section 23 can be smoothly inserted into the insertion port 36 and the inner insertion port 82.

Furthermore, in the middle of the insertion of the gas injection section 23 into the insertion port 36 and the inner insertion port 82, the first installing protrusion 24 and the second installing protrusion 25 are inserted into the corresponding engaging holes 75 in the cover cloth 71 as shown in FIG. 20. The first installing protrusion 24 and the second installing protrusion 25 are positioned with respect to the bag body 31 via the cover cloth 71 by these insertions. In the state in which the first installing protrusion 24 and the second installing protrusion 25 have been positioned as described above, the gas generator 20 is assembled on the airbag 30.

Next, operation and effects in the case that the inflation gas has been injected from the gas injection section 23 of the gas generator 20 will be described.

The inflation gas injected from the gas injection section 23 is supplied to the bag body 31. At this time, as shown in FIG. 20, since the clearance between the gas generator 20 and each of the peripheral edge sections of the insertion port 36 and the inner insertion port 82 is made small, the inflation gas injected from the gas injection section 23 hardly leaks to the outside of the airbag 30 through the above-mentioned clearance as in the first embodiment.

Moreover, in the second embodiment, the insertion port 36 and the inner insertion port 82 into which the gas injection section 23 of the gas generator 20 has been inserted are covered with the cover cloth 71 from the outside of the bag body 31. Hence, even if the inflation gas has passed through the clearance between the gas generator 20 and each of the peripheral edge sections of the insertion port 36 and the inner insertion port 82, the inflation gas cannot leak to the outside of the airbag 30 without passing through the clearance between the bag body 31 and the cover cloth 71. Hence, the leakage of the inflation gas to the outside of the airbag 30 is further suppressed in this case than in the case that the inner insertion port 82 and the insertion port 36 are not covered with the cover cloth 71.

When the inflation gas is injected from the gas injection section 23, a force exerted in the direction along the axial line L1 is applied to the bag body 31, and the bag body 31 is pulled in the same direction together with the insertion port 36. In this respect, in the second embodiment, the cover cloth 71 is joined to the bag body 31 using the end edge joint section 73 at a portion close to the insertion port 36, whereby the portion is reinforced. Hence, even if the insertion port 36 is pulled in the direction along the axial line L1, the insertion port 36 can be suppressed from being deformed excessively in the same direction. As a result, the gas injection section 23 can be suppressed from coming off to the outside of the bag body 31 through the inner insertion port 82 and the insertion port 36.

In particular, in the second embodiment, since the inside cloth 81 is joined to the bag body 31 using the end edge joint section 73, the inside cloth 81 as well as the cover cloth 71 is joined to the bag body 31 using the end edge joint section 73 at the portion close to the insertion port 36. Hence, the portion is further reinforced. Consequently, even if the insertion port 36 is pulled in the direction along the axial line L1, the insertion port 36 can be suppressed effectively from being deformed excessively in the same direction.

The cylindrical section 77 covers the gas injection section 23 that is inserted into the insertion port 36 and the inner insertion port 82. The cylindrical section 77 is made of a metallic material having heat resistance higher than that of the bag body 31. Hence, in the case that the inflation gas is injected from the gas injection section 23, the cylindrical section 77 receives the inflation gas, thereby regulating the inflation gas from directly making contact with the inside cloth 81 and the bag body 31. As a result, the inside cloth 81 and the bag body 31 can be suppressed from being adversely affected by the heat of the inflation gas.

With the second embodiment, the following effects are obtained in addition to those described above.

Also in the second embodiment, as in the first embodiment, the bag body 31 is not provided with engaging holes for allowing the first installing protrusion 24 and the second installing protrusion 25 to be inserted. Hence, unlike the configuration described in JP-A-2017-81248, the inflation gas does not leak through the clearances between the peripheral edge sections of such engaging holes and the first installing protrusion 24 and the second installing protrusion 25, whereby the leakage of the inflation gas to the outside of the airbag 30 can be further suppressed.

The pair of side edge joint sections 72 and the end edge joint section 73 for joining the cover cloth 71 to the bag body 31 are also used to join the inside cloth 81 to the bag body 31. Hence, the number of joint sections and the number of joining processes can be more reduced in this case than in the case that the cover cloth 71 and the inside cloth 81 are joined to the bag body 31 using separate joint sections.

Since the guide joint sections 84 and the peripheral edge joint section 83 are formed, the inside cloth 81 is first joined to the bag body 31, and then the side edge joint sections 72 and the end edge joint section 73 are formed, the cover cloth 71 and the inside cloth 81 can be joined (sewn together) to the bag body 31.

The above-mentioned respective embodiments can also be embodied as modifications changed as described below.

<Items Concerning Only to the First Embodiment>

A generator body configured such that the gas injection section 23 and the gas generation section 22 are covered with a cylindrical retainer may be used as the generator body 21 of the gas generator 20. In this case, the retainer constitutes the outer circumferential portion of the generator body 21. The retainer is fastened to the gas generation section 22 by caulking, for example. The first installing protrusion 24 and the second installing protrusion 25 are provided on the retainer instead of on the generator body 21.

In the case that the generator body 21 is composed of the gas injection section 23, the gas generation section 22 and the retainer as described above, the following two modes are available as modes for assembling the generator body 21 on the airbag 30.

First mode: In the generator body 21 in which the gas injection section 23 and the gas generation section 22 are installed in the retainer, the portion of the generator body 21 on the side of the gas injection section 23 away from the first installing protrusion 24 is inserted into the insertion port 36, whereby the portion is disposed inside the bag body 31, and the first installing protrusion 24 and the second installing protrusion 25 are disposed outside the bag body 31.

Second mode: The retainer is assembled on the airbag 30 separately from the gas injection section 23 and the gas generation section 22. In this mode, the portion of the retainer on the side of the gas injection section 23 away from the first installing protrusion 24 is first inserted into the insertion port 36, whereby the portion is disposed inside the bag body 31, and the first installing protrusion 24 and the second installing protrusion 25 are disposed outside the bag body 31. After that, the gas injection section 23 and the gas generation section 22 are inserted into the retainer, whereby the gas injection section 23 is into the insertion port 36 and disposed inside the airbag 30.

In both the first mode and the second mode described above, the gas generator provided with the first installing protrusion 24 and the second installing protrusion 25 protruding in the direction orthogonal to the axial line L1 is used as the gas generator 20. Hence, with the configuration in which the first installing protrusion 24 and the second installing protrusion 25 are disposed outside the bag body 31, the insertion port 36 and the insertion hole 39 are made small, and an effect of suppressing the leakage of the inflation gas from the airbag 30 is obtained.

A cover formed of a material having heat resistance higher than that of the bag body 31 and being used to cover the gas injection section 23 may be disposed close to (adjacent to) the insertion port 36 inside the bag body 31. With this configuration, the inflation gas injected from the gas injection section 23 can be suppressed from directly making contact with the bag body 31.

The belt 41 may be extended in the circumferential direction of the generator body 21. Also in this case, the intermediate section 45 of the belt 41 is preferably disposed at the position for covering the insertion port 36, and an effect of suppressing the leakage of the inflation gas can be expected using the intermediate section 45.

The pair of auxiliary belts 51 may be formed of separate cloth pieces. In this case, the one end sections 52 of both the auxiliary belts 51 are disposed at positions adjacent to each other in the circumferential direction of the generator body 21 and are joined to the bag body 31.

Both the end sections 52 may be disposed at positions adjacent to each other in the circumferential direction of the generator body 21 with a space provided therebetween, in this case, the insertion hole 39 may be omitted.

The order of engaging the belt 41 and both the auxiliary belts 51 with the second installing protrusion 25 may be changed.

The tip end section 43 of the belt 41 may be engaged with the gas generator 20 at a position different from the position of the second installing protrusion 25.

Similarly, the end sections 54 of the auxiliary belts 51 may be engaged with the gas generator 20 at a position different from the position of the second installing protrusion 25.

<Items Concerning Only to the Second Embodiment>

The size and shape of the cover cloth 71 can be changed on the condition that the cover cloth 71 covers the insertion port 36 and also covers at least the portions of the generator body 21 provided with the first installing protrusion 24 and the second installing protrusion 25. For example, a cloth piece having a size and a shape covering the insertion port 36 and the entire generator body 21 may be used as the cover cloth 71.

The insertion assisting tool 76 and the inside cloth 81 may be omitted. Even in this case, an effect of suppressing the leakage of the inflation gas to the outside of the airbag 30 is obtained.

In this case, as described as an item concerning only to the above-mentioned first embodiment, a generator body configured such that the gas injection section 23 and the gas generation section 22 are covered with a cylindrical retainer may be used as the generator body 21 of the gas generator 20.

The plate section 78 may be held on the bag body 31 by using a structure different from the structure in which the plate section 78 is sandwiched between the bag body 31 and the inside cloth 81. For example, the plate section 78 may be held on the bag body 31 without using the inside cloth 81.

The insertion assisting tool 76 may be formed of a material different from a metal on the condition that the material has heat resistance higher than that of the bag body 31.

The cylindrical section 77 of the insertion assisting tool 76 may cover only the gas injection section 23 of the gas generator 20.

The inside cloth 81 may be joined to the bag body 31 using a joint section different from the cover cloth 71.

<Items Common to the First and Second Embodiments>

At least one of the first installing protrusion 24 and the second installing protrusion 25 in the gas generator 20 may be changed to a member different from the bolt on the condition that the member can fasten the generator body 21 to a vehicle.

The installing protrusions may be provided at three or more plural positions in the direction along the axial line L1. In this case, all the installing protrusions may be fastened to the side frame section 15 in the same form (for example, fastening using a bolt and a nut) or in forms different from one another.

The gas generator 20 may be composed of the generator body 21 and one installing protrusion.

The bag body 31 of the airbag 30 may be configured such that almost the entire bag body is composed of portions that are inflated as described in the above-mentioned respective embodiments, but may partly have non-inflation sections that are not inflated because the inflation gas is not supplied thereto.

The inside of the bag body 31 may be composed of a single chamber, instead of being partitioned into a plurality of chambers (inflation chambers).

The size of the insertion port 36 in the bag body 31 may be changed to a size allowing the gas injection section 23 to pass through and not allowing the gas generation section 22 to pass through.

<Types of Applicable Airbag Devices>

In the case that airbag devices are each equipped with a gas generator having a generator body and installing protrusions and an airbag being developed and inflated by inflation gas injected from a gas injection section and that the gas generator and the airbag can be installed on a vehicle, such airbag devices are also applicable to types of airbag devices different from side airbag devices.

As one example, a knee protection airbag device (also referred to as a knee airbag device) is available. In this type of airbag device, in response to an impact applied to a vehicle, the bag body is inflated on the front lower sides of the lower limbs of an occupant sitting on a vehicle seat, thereby protecting the portions of the occupant ranging from the shins to the knees.

In addition, such airbag devices are also applicable to types of seat cushion airbag devices. In this type of airbag device, in response to an impact applied to a vehicle, the bag body disposed inside the seat cushion of a vehicle seat is inflated by inflation gas to raise the surface of the seat, thereby regulating the occupant on the seat cushion from moving forward.

<Others>

In the case that, in a vehicle in which the vehicle seat 12 is disposed so as to have a posture being directed in a direction different from the front of the vehicle, for example, sideways, an impact is applied sideways to the vehicle seat 12 (in the front-rear direction of the vehicle), the above-mentioned side airbag device is also applicable to a type of side airbag device for protecting the occupant P1 from the impact.

The portion to be protected by the side airbag device may be changed to a portion different from the portion of the upper half of the occupant P1 in the above-mentioned embodiments. In this case, the shape and the size of the airbag 30 are changed to the shape and the size capable of protecting the portion of the occupant P1 to be protected.

Vehicles to which the above-mentioned airbag device is applied are not limited to cars but include various kinds of industrial vehicles.

The above-mentioned airbag device is also applicable to airbag devices to be mounted on seats for use in means for transportation other than vehicles, such as airplanes and ships.

According to an aspect of the invention, there is provided an airbag device comprising: a gas generator which is extended along an axial line thereof and which includes: a generator body including a gas injection section at one end section; and an installing protrusion protruding from an outer face of the generator body surrounding the axial line; and an airbag which includes a bag body developed and inflated by an inflation gas supplied from the gas injection section, wherein the gas generator and the airbag are installed on a vehicle by the installing protrusion, the bag body includes an insertion port having a size allowing the gas injection section to pass through and not allowing a portion of the gas generator provided with the installing protrusion to pass through, and the gas injection section passes through the insertion port and is disposed inside the bag body, and the installing protrusion is disposed outside the bag body.

The gas generator and the airbag in the airbag device having the above-mentioned configuration are installed on the vehicle by the installing protrusion of the gas generator. At the time of this installation, the gas injection section at one end section of the generator body of the gas generator is inserted into the insertion port in the bag body of the airbag, passes through the insertion port, and is disposed inside the bag body. The installing protrusion is disposed outside the bag body. Hence, since the installing protrusion is not required to be inserted into the bag body, the insertion port may merely have a size allowing the gas injection section to pass through, thereby not required to have a size allowing the portion of the gas generator provided with the installing protrusion to pass through. In this respect, with the above-mentioned configuration, the insertion port has a size allowing the gas injection section to pass through and not allowing the portion of the gas generator provided with the installing protrusion to pass through. Consequently, the clearance between the peripheral edge section of the insertion port and the gas generator becomes smaller than that in a configuration in which the installing protrusion is also inserted into the insertion port and disposed inside the bag body.

When an impact is applied to the vehicle equipped with the above-mentioned airbag device, for example, due to a collision, inflation gas is injected from the gas injection section. This inflation gas is supplied to the bag body, and the bag body is developed and inflated, whereby the occupant of the vehicle is protected from the impact. At this time, since the clearance between the peripheral edge section of the insertion port and the gas generator is small, the inflation gas injected from the gas injection section hardly passes through the clearance.

In the above-mentioned airbag device, it is preferable that a belt, one end section of which is a base end section and the other end section of which is a tip end section, is disposed outside the bag body, and the base end section of the belt is joined to the bag body, and the tip end section of the belt is engaged with a portion of the gas generator away from the gas injection section.

With the above-mentioned configuration, the tip end section of the belt disposed outside the bag body and joined to the bag body at the base end section is engaged with the gas generator at a position away from the gas injection section, whereby the airbag is in a state of being connected to the gas generator via the belt.

In the above-mentioned airbag device, an intermediate section of the belt between the base end section and the tip end section is preferably disposed at a position covering the insertion port.

With the above-mentioned configuration, the insertion port is covered with the intermediate section of the belt, the base end section of which is joined to the bag body and the tip end section of which is engaged with the gas generator. The insertion port is in a state of being blocked with the intermediate section of the belt. Even if the inflation gas has passed through the clearance between the peripheral edge section of the insertion port and the gas generator, the inflation gas cannot leak to the outside of the airbag without passing through the clearance between the insertion port and the belt. Hence, the leakage of the inflation gas to the outside of the airbag is further suppressed in this case than in the case that the insertion port is not covered with the intermediate section of the belt.

In the above-mentioned airbag device, the belt is preferably extended in the axial line.

With the above-mentioned configuration, the belt disposed so as to be extended along the axial line of the generator body, whereby the airbag is in a state of being connected to the gas generator via the belt. Furthermore, the generator body is regulated from moving with respect to the bag body in the direction along the axial line of the generator body, that is, in the direction of coming off from the insertion port.

In the above-mentioned airbag device, it is preferable that the installing protrusion includes installing protrusions which are provided at two positions in a direction along the axial line, one of the installing protrusions which is close to the gas injection section is a first installing protrusion, and the other of the installing protrusions which is away from the gas injection section is a second installing protrusion, and the belt is hooked to the first installing protrusion at a position adjacent to the base end section and is engaged with the second installing protrusion at the tip end section.

With the above-mentioned configuration, in the state in which the gas generator and the airbag are installed on the vehicle at the installing protrusions, the gas injection section passes through the insertion port and is disposed inside the bag body. Both the first installing protrusion close to the gas injection section and the second installing protrusion away from the gas injection section are disposed outside the bag body. The belt is hooked to the first installing protrusion at the position adjacent to the base end section and engaged with the second installing protrusion at the tip end section.

Hence, the belt joined to the bag body at the base end section is in a state of being connected to the gas generator at the two positions separated from each other.

In the above-mentioned airbag device, it is preferable that the belt is configured so as to be foldable with the base end section joined to the bag body being used as a fulcrum, a slot, which is extended from the base end section to the tip end section and into which the first installing protrusion is inserted, is formed in the belt, the slot is overlapped with the insertion port at a position where the base end section of the belt is joined to the bag body, and a positioning section is formed at the position where the slot is overlapped with the insertion port, and the first installing protrusion having been inserted into the slot is engaged with the positioning section in a state in which the gas injection section is inserted into the insertion port, whereby the positioning section positions the first installing protrusion.

With the above-mentioned configuration, when the gas generator is assembled on the airbag, the belt is folded with the base end section joined to the bag body being used as a fulcrum. By this bending, the tip end side portion of the belt is more separated from the bag body than the base end section. The gas injection section of the gas generator is inserted into the insertion port. By this insertion, the first installing protrusion is moved to the side of the insertion port. When the first installing protrusion is engaged with the positioning section of the slot, the first installing protrusion is in a state of being positioned with respect to the bag body. Furthermore, the belt is folded back to the side close to the second installing protrusion with the base end section joined to the bag body being used as a fulcrum. At this time, since the first installing protrusion is inserted into the slot, interference between the belt and the first installing protrusion is avoided. Furthermore, when the folded-back portion of the belt approaches the second installing protrusion and the tip end section is engaged with the second installing protrusion, the belt is connected to the gas generator at two positions separated from each other along the axial line.

In the above-mentioned airbag device, it is preferable that an engaging hole is formed in the tip end section of the belt, and, in the gas generator being in the state in which the first installing protrusion is engaged with the positioning section, the second installing protrusion is inserted into the engaging hole, whereby the belt is engaged with the second installing protrusion.

With the above-mentioned configuration, since the first installing protrusion is engaged with the positioning section of the belt, the belt is folded back and brought close to the second installing protrusion in the state in which the belt is positioned with respect to the bag body. When the second installing protrusion is inserted into the engaging hole in the tip end section of the belt, the belt is engaged with the second installing protrusion at the engaging hole in the tip end section, whereby the belt is connected to the gas generator at the two positions separated from each other along the axial line. The belt is held between the first installing protrusion and the second installing protrusion in a tensioned state. In the case that the second installing protrusion is extracted from the engaging hole, the engagement state of the belt with the second installing protrusion is released.

In the above-mentioned airbag device, it is preferable that the generator body is cylindrical, an auxiliary belt wound on the generator body is disposed outside the bag body, and one end section of the auxiliary belt is joined to the bag body, and the other end section of the auxiliary belt is engaged at a position away from the one end section of the auxiliary belt in a circumferential direction of the generator body.

With the above-mentioned configuration, the auxiliary belt disposed outside the bag body and connected to the bag body at one end sections thereof is wound on the generator body. The other end section of the auxiliary belt is engaged at the position away from the above-mentioned one end section of the auxiliary belt in the circumferential direction of the generator body of the gas generator, whereby the airbag is in a state of being connected to the gas generator via the auxiliary belt. Hence, when the bag body is developed and inflated by the inflation gas injected from the gas injection section, the bag body is regulated by the above-mentioned auxiliary belt from swinging with the insertion port into which the gas injection section is inserted being used as a fulcrum.

In the above-mentioned airbag device, it is preferable that the auxiliary belt includes a pair of auxiliary belts, one end sections of which are adjacent to each other and joined to the bag body, and the respective auxiliary belts are wound on the generator body in directions opposite to each other in the circumferential direction of the generator body and are engaged with the gas generator at the other end sections.

With the above-mentioned configuration, the pair of auxiliary belts, the one end sections of which are joined to the bag body in a state of being adjacent to each other, is wound on the generator body in the directions opposite to each other in the circumferential direction of the generator body and engaged with the gas generator at the other end sections. By the above-mentioned engagement of both the auxiliary belts, the airbag is in a state of being connected to the gas generator via the pair of auxiliary belts. Furthermore, both the auxiliary belts are wound on the generator body in the directions opposite to each other. Hence, when the bag body is developed and inflated, the auxiliary belts can regulate the swinging of the bag body more effectively in this case than in the case in which the number of the auxiliary belts is one.

In the above-mentioned airbag device, it is preferable that an engaging hole is formed in the other end section of the auxiliary belt, and the installing protrusion is inserted into the engaging hole, whereby the auxiliary belt is engaged with the installing protrusion.

With the above-mentioned configuration, the auxiliary belt disposed outside the bag body and joined to the bag body at the one end sections thereof is wound on the generator body. The installing protrusion is inserted into the engaging hole in the other end section of the auxiliary belt, whereby the other end section of the auxiliary belt is engaged with the installing protrusion located away from the above-mentioned one end section of the auxiliary belt in the circumferential direction of the generator body. In the case that the installing protrusion is extracted from the engaging hole, the engagement state of the auxiliary belt with the installing protrusion is released.

In the above-mentioned airbag device, it is preferable that a cover cloth for covering the insertion port and for covering at least a portion of the generator body provided with the installing protrusion is disposed outside the bag body and joined to the bag body, an engaging hole is formed in the cover cloth, and, in the gas generator, the gas injection section of which passes through the insertion port and is disposed inside the bag body, the installing protrusion disposed outside the bag body is inserted into the engaging hole.

With the above-mentioned configuration, at the time of the assembling of the gas generator on the airbag, the gas injection section of the gas generator is inserted into the insertion port, passes through the insertion port and is disposed inside the bag body. At least the portion of the generator body provided with the installing protrusion is disposed outside the bag body and covered with the cover cloth joined to the bag body. The installing protrusion is positioned with respect to the bag body via the cover cloth by the insertion. In the state in which the installing protrusion has been positioned as described above, the gas generator is assembled on the airbag.

The insertion port into which the gas injection section of the gas generator has been inserted is covered with the cover cloth from the outside of the bag body. Hence, even if the inflation gas has passed through the clearance between the peripheral edge section of the insertion port and the gas generator, the inflation gas cannot leak to the outside of the airbag without passing through the clearance between the bag body and the cover cloth. Hence, the leakage of the inflation gas to the outside of the airbag is further suppressed in this case than in the case that the insertion port is not covered with the cover cloth.

In the above-mentioned airbag device, it is preferable that the airbag device further comprises: an insertion assisting tool which assists insertion of the gas injection section into the insertion port by deforming at least a peripheral portion of the insertion port of the bag body so as to be away from the cover cloth to an inside of the bag body.

With the above-mentioned configuration, at least the peripheral portion of the insertion port in the bag body is deformed by the insertion assisting tool so as to be away from the cover cloth to the inside of the bag body. The insertion port is in a state of being inclined with respect to the axial line of the gas generator by this deformation. Hence, the gas injection section can be smoothly inserted into the insertion port by inserting the gas generator between the bag body and the cover cloth.

In the above-mentioned airbag device, it is preferable that the insertion assisting tool includes a cylindrical section and a plate section, and is disposed inside the bag body, the cylindrical section is disposed at a position adjacent to the insertion port, and covers at least the gas injection section of the generator body, and the plate section is extended from a peripheral edge section of the cylindrical section on a side away from the cover cloth in a radial direction of the cylindrical section to an opposite side of the gas injection section with the insertion port disposed therebetween in a direction along the axial line, and is held on the bag body.

In the state in which the insertion assisting tool having the above-mentioned configuration is disposed inside the bag body, the cylindrical section is located adjacent to the insertion port. The plate section is extended from the cylindrical section to the opposite side of the gas injection section with the insertion port placed therebetween in the direction along the axial line of the generator body, and held on the bag body.

The plate section is extended from the peripheral edge section of the cylindrical section on the side away from the cover cloth in the radial direction of the cylindrical section. Hence, at least the peripheral portion of the insertion port in the bag body is deformed by the cylindrical section and the plate section so as to be away from the cover cloth to the inside of the bag body.

The cylindrical section covers at least the gas injection section of the gas generator. Hence, in the case that the inflation gas is injected from the gas injection section, the cylindrical section receives the inflation gas, thereby regulating the inflation gas from directly making contact with the bag body. By this regulation, the bag body is suppressed from being adversely affected by the heat of the inflation gas.

In the above-mentioned airbag device, it is preferable that an inside cloth is disposed inside the bag body and joined to the bag body, an inner insertion port is formed in the inside cloth at a position opposed to the insertion port so as to communicate with the insertion port, and the plate section of the insertion assisting tool is disposed between the bag body and the inside cloth and held on the bag body.

With the above-mentioned configuration, the plate section is sandwiched between the bag body and the inside cloth, thereby being held on the bag body. Hence, no special structure is required to hold the plate section on the bag body. Furthermore, the plate section is disposed between the bag body and the inside cloth and held on the bag body by performing a simple operation of inserting the plate section into the area between the bag body and the inside cloth.

At the time of the assembling of the gas generator on the airbag, the gas injection section of the gas generator is inserted into the insertion port in the bag body and then into the inner insertion port in the inside cloth, passes through the insertion port and the inner insertion port and is disposed inside the bag body.

In the above-mentioned airbag device, the inner insertion port is preferably formed longer than the insertion port to a side away from the cylindrical section of the insertion assisting tool.

With the above-mentioned configuration, the plate section of the insertion assisting tool is inserted from the area between the peripheral edge portion of the insertion port in the bag body and the peripheral edge portion of the inner insertion port in the inside cloth to the area between the bag body and the inside cloth.

In the case that the inner insertion port is formed longer than the insertion port to the side away from the cylindrical section as in the above-mentioned configuration, a part of the peripheral edge portion of the insertion port in the bag body is located on the outside of the portion of the inner insertion port by which the inner insertion port is longer than the insertion port. This portion functions as a marker at the time when the plate section is inserted between the bag body and the inside cloth. In the peripheral edge portion of the insertion port in the bag body and the peripheral edge portion of the inner insertion port in the inside cloth, the position where the plate section is inserted between the bag body and the inside cloth is simply recognized by this marker. Furthermore, the plate section is made contact with the portion serving as the above-mentioned marker and slid to the side away from the cylindrical section, whereby the plate section is guided to the area between the bag body and the inside cloth.

In the above-mentioned airbag device, it is preferable that a part of a joint section for joining the inside cloth to the bag body includes a pair of guide joint sections which are provided at positions so as to sandwich the plate section from both sides in a width direction of the plate section, and which are extended in a length direction of the plate section to guide insertion of the plate section between the bag body and the inside cloth.

With the above-mentioned configuration, both the guide joint sections have a function of joining the inside cloth to the bag body. In addition, both the guide joint sections have a function of guiding the insertion of the plate section into the area between the bag body and the inside cloth. Hence, when the plate section is inserted in the area between the bag body and the inside cloth and the area sandwiched both the guide joint sections, the plate section is made to have a posture being extended from the cylindrical section to the opposite side of the gas injection section with the insertion port disposed therebetween in the direction along the axial line, and held on the bag body. In the state of being held, the plate section is regulated from moving in the width direction by both the guide joint sections.

In the above-mentioned airbag device, it is preferable that the insertion assisting tool includes a regulating section provided at an end section of the plate section on an opposite side of the cylindrical section and exposed from an area between the bag body and the inside cloth, and the regulating section makes contact with an end edge of the inside cloth, thereby regulating movement of the plate section to a side of the cylindrical section.

With the above-mentioned configuration, although the plate section of the insertion assisting tool is disposed in the area between the bag body and the inside cloth, the regulating section is exposed from the area between the bag body and the inside cloth. The regulating section makes contact with the end edge of the inside cloth, thereby regulating the movement of the plate section to the side of the cylindrical section. Hence, the regulating section regulates the plate section from coming off downward from the area between the bag body and the inside cloth.

In the above-mentioned airbag device, it is preferable that, in a case that an impact is applied from a side of the vehicle to a side wall section of the vehicle, the airbag is developed and inflated between the side wall section and a vehicle seat to protect an occupant sitting on the vehicle seat.

The clearance between the side wall section of the vehicle and the occupant sitting on the vehicle seat is small. In addition, when an impact is applied from the side to the side wall section due to a collision or the like, the side wall section is deformed to the vehicle interior side, whereby the above-mentioned clearance between the side wall section and the occupant becomes smaller. The airbag is required to be developed and inflated in a short time in order that the airbag is developed and inflated in this small clearance. Hence, it is important to reduce the amount of the inflation gas leaking to the outside of the airbag. In this respect, since the installing protrusions are disposed outside the bag body as described above, the clearance between the peripheral edge section of the insertion port and the gas generator is made small and the leakage amount of the inflation gas to the outside of the airbag is reduced. Hence, even if the clearance between the side wall section and the occupant is small, the airbag can be developed and inflated in a short time and the occupant can be protected from the impact appropriately.

With the above-mentioned airbag device, the leakage of inflation gas to the outside of the airbag can be suppressed.

What is claimed is:

1. An airbag device comprising:
   a gas generator which is extended along an axial line thereof and which includes: a generator body including a gas injection section at one end section; and an installing protrusion protruding from an outer face of the generator body surrounding the axial line; and
   an airbag which includes a bag body developed and inflated by an inflation gas supplied from the gas injection section, wherein
   the gas generator and the airbag are installed on a vehicle by the installing protrusion,
   the bag body includes an insertion port having a size allowing the gas injection section to pass through and not allowing a portion of the gas generator provided with the installing protrusion to pass through, the gas injection section passes through the insertion port and is disposed inside the bag body, and the installing protrusion is disposed outside the bag body, a belt, one end section of which is a base end section and the other end section of which is a tip end section, is disposed outside the bag body, and the base end section of the belt is joined to the bag body, and the tip end section of the belt is engaged with a portion of the gas generator away from the gas injection section, an intermediate section of the belt between the base end section and the tip end section is disposed at a position covering the insertion port, the belt is extended along the axial line, the installing protrusion includes installing protrusions which are provided at two positions in a direction along the axial line, one of the installing protrusions which is close to the gas injection section is a first installing protrusion, and the other of the installing protrusions which is away from the gas injection section is a second installing protrusion, and the belt is hooked to the first installing protrusion at a position adjacent to the base end section and is engaged with the second installing protrusion at the tip end section.

2. The airbag device according to claim 1, wherein the belt is configured to be foldable with the base end section joined to the bag body being used as a fulcrum, a slot, which is extended from the base end section to the tip end section and into which the first installing protrusion is inserted, is formed in the belt, the slot is overlapped with the insertion port at a position where the base end section of the belt is joined to the bag body, and a positioning section is formed at the position where the slot is overlapped with the insertion port, and the first installing protrusion having been inserted into the slot is engaged with the positioning section in a state in which the gas injection section is inserted into the insertion port, whereby the positioning section positions the first installing protrusion.

3. The airbag device according to claim 2, wherein an engaging hole is formed in the tip end section of the belt, and in the gas generator being in the state in which the first installing protrusion is engaged with the positioning section, the second installing protrusion is inserted into the engaging hole, whereby the belt is engaged with the second installing protrusion.

4. The airbag device according to claim 1, wherein the generator body is cylindrical, an auxiliary belt wound on the generator body is disposed outside the bag body, and one end section of the auxiliary belt is joined to the bag body, and the other end section of the auxiliary belt is engaged at a position away from the one end section of the auxiliary belt in a circumferential direction of the generator body.

5. The airbag device according to claim 4, wherein the auxiliary belt includes a pair of auxiliary belts, one end sections of which are adjacent to each other and joined to the bag body, and the respective auxiliary belts are wound on the generator body in directions opposite to each other in the circumferential direction of the generator body and are engaged with the gas generator at the other end sections.

6. The airbag device according to claim 4, wherein an engaging hole is formed in the other end section of the auxiliary belt, and the installing protrusion is inserted into the engaging hole, whereby the auxiliary belt is engaged with the installing protrusion.

7. The airbag device according to claim 1, wherein, in a case that an impact is applied from a side of the vehicle to a side wall section of the vehicle, the airbag is developed and inflated between the side wall section and a vehicle seat to protect an occupant sitting on the vehicle seat.

8. An airbag device comprising:

a gas generator which is extended along an axial line thereof and which includes: a generator body including a gas injection section at one end section; and an installing protrusion protruding from an outer face of the generator body surrounding the axial line; and an airbag which includes a bag body developed and inflated by an inflation gas supplied from the gas injection section, wherein the gas generator and the airbag are installed on a vehicle by the installing protrusion, the bag body includes an insertion port having a size allowing the gas injection section to pass through and not allowing a portion of the gas generator provided with the installing protrusion to pass through, the gas injection section passes through the insertion port and is disposed inside the bag body, and the installing protrusion is disposed outside the bag body, a cover cloth for covering the insertion port and for covering at least a portion of the generator body provided with the installing protrusion is disposed outside the bag body and joined to the bag body, an engaging hole is formed in the cover cloth, in the gas generator, the gas injection section of which passes through the insertion port and is disposed inside the bag body, the installing protrusion disposed outside the bag body is inserted into the engaging hole, the airbag device further comprises an insertion assisting tool which assists insertion of the gas injection section into the insertion port by deforming at least a peripheral portion of the insertion port of the bag body to be away from the cover cloth to an inside of the bag body, the insertion assisting tool includes a cylindrical section and a plate section, and is disposed inside the bag body, the cylindrical section is disposed at a position adjacent to the insertion port, and covers at least the gas injection section of the generator body, and the plate section is extended from a peripheral edge section of the cylindrical section on a side away from the cover cloth in a radial direction of the cylindrical section to an opposite side of the gas injection section with the insertion port disposed therebetween in a direction along the axial line, and is held on the bag body.

9. The airbag device according to claim 8, wherein an inside cloth is disposed inside the bag body and joined to the bag body, an inner insertion port is formed in the inside cloth at a position opposed to the insertion port to communicate with the insertion port, and the plate section of the insertion assisting tool is disposed between the bag body and the inside cloth and held on the bag body.

10. The airbag device according to claim 9, wherein the inner insertion port is formed longer than the insertion port to a side away from the cylindrical section of the insertion assisting tool.

11. The airbag device according to claim 9, wherein a part of a joint section for joining the inside cloth to the bag body includes a pair of guide joint sections which are provided at positions to sandwich the plate section from both sides in a width direction of the plate section, and which are extended in a length direction of the plate section to guide insertion of the plate section between the bag body and the inside cloth.

12. The airbag device according to claim 9, wherein
the insertion assisting tool includes a regulating section provided at an end section of the plate section on an opposite side of the cylindrical section and exposed from an area between the bag body and the inside cloth, and
the regulating section makes contact with an end edge of the inside cloth, thereby regulating movement of the plate section to a side of the cylindrical section.

13. An airbag device comprising:
a gas generator which is extended along an axial line thereof and which includes: a generator body including a gas injection section at one end section; and an installing protrusion protruding from an outer face of the generator body surrounding the axial line; and
an airbag which includes a bag body developed and inflated by an inflation gas supplied from the gas injection section, wherein
the gas generator and the airbag are installed on a vehicle by the installing protrusion,
the bag body includes an insertion port having a size allowing the gas injection section to pass through and not allowing a portion of the gas generator provided with the installing protrusion to pass through,
the gas injection section passes through the insertion port and is disposed inside the bag body, and the installing protrusion is disposed outside the bag body,
a belt, one end section of which is a base end section and the other end section of which is a tip end section, is disposed outside the bag body,
the base end section of the belt is joined to the bag body, and the tip end section of the belt is engaged with a portion of the gas generator away from the gas injection section,
the generator body is cylindrical,
an auxiliary belt wound on the generator body is disposed outside the bag body, and
one end section of the auxiliary belt is joined to the bag body, and the other end section of the auxiliary belt is engaged at a position away from the one end section of the auxiliary belt in a circumferential direction of the generator body.

14. The airbag device according to claim 13, wherein
the auxiliary belt includes a pair of auxiliary belts, one end sections of which are adjacent to each other and joined to the bag body, and
the respective auxiliary belts are wound on the generator body in directions opposite to each other in the circumferential direction of the generator body and are engaged with the gas generator at the other end sections.

15. The airbag device according to claim 13, wherein
an engaging hole is formed in the other end section of the auxiliary belt, and
the installing protrusion is inserted into the engaging hole, whereby the auxiliary belt is engaged with the installing protrusion.

16. The airbag device according to claim 13, wherein an intermediate section of the belt between the base end section and the tip end section is disposed at a position covering the insertion port.

17. The airbag device according to claim 16, wherein the belt is extended along the axial line.

18. The airbag device according to claim 17, wherein
the installing protrusion includes installing protrusions which are provided at two positions in a direction along the axial line,
one of the installing protrusions which is close to the gas injection section is a first installing protrusion, and the other of the installing protrusions which is away from the gas injection section is a second installing protrusion, and
the belt is hooked to the first installing protrusion at a position adjacent to the base end section and is engaged with the second installing protrusion at the tip end section.

19. The airbag device according to claim 18, wherein
the belt is configured to be foldable with the base end section joined to the bag body being used as a fulcrum,
a slot, which is extended from the base end section to the tip end section and into which the first installing protrusion is inserted, is formed in the belt,
the slot is overlapped with the insertion port at a position where the base end section of the belt is joined to the bag body, and
a positioning section is formed at the position where the slot is overlapped with the insertion port, and the first installing protrusion having been inserted into the slot is engaged with the positioning section in a state in which the gas injection section is inserted into the insertion port, whereby the positioning section positions the first installing protrusion.

20. The airbag device according to claim 19, wherein
an engaging hole is formed in the tip end section of the belt, and
in the gas generator being in the state in which the first installing protrusion is engaged with the positioning section, the second installing protrusion is inserted into the engaging hole, whereby the belt is engaged with the second installing protrusion.

* * * * *